(12) United States Patent
Balasubramanian et al.

(10) Patent No.: US 11,463,984 B2
(45) Date of Patent: Oct. 4, 2022

(54) POSITION ESTIMATION USING INTER-PUE SIGNALING

(71) Applicant: QUALCOMM Incorporated, San Diego, CA (US)

(72) Inventors: Anantharaman Balasubramanian, San Diego, CA (US); Kapil Gulati, Belle Mead, NJ (US); Taesang Yoo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/078,820

(22) Filed: Oct. 23, 2020

(65) Prior Publication Data

US 2022/0132462 A1 Apr. 28, 2022

(51) Int. Cl.
| | |
|---|---|
| *H04W 64/00* | (2009.01) |
| *H04W 4/40* | (2018.01) |
| *G01S 5/02* | (2010.01) |
| *G01S 13/76* | (2006.01) |
| *H04W 4/06* | (2009.01) |
| *H04W 24/10* | (2009.01) |
| *H04W 92/18* | (2009.01) |

(52) U.S. Cl.
CPC ......... *H04W 64/006* (2013.01); *G01S 5/0284* (2013.01); *G01S 13/765* (2013.01); *H04W 4/06* (2013.01); *H04W 4/40* (2018.02); *H04W 24/10* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 8,483,717 B2 | 7/2013 | Sheynblat | |
| 8,971,913 B2 | 3/2015 | Moeglein et al. | |
| RE45,808 E | 11/2015 | Sheynblat et al. | |
| 2004/0127229 A1* | 7/2004 | Ishii | H04W 4/02 455/456.1 |
| 2019/0208387 A1* | 7/2019 | Jiang | H04W 72/044 |
| 2019/0268726 A1 | 8/2019 | Jiang et al. | |
| 2020/0305116 A1 | 9/2020 | Berggren et al. | |

OTHER PUBLICATIONS

International Search Report and Written Opinion—PCT/US2021/048543—ISA/EPO—dated Feb. 10, 2022.

* cited by examiner

*Primary Examiner* — Adolf Dsouza
(74) *Attorney, Agent, or Firm* — Weaver Austin Villeneuve & Sampson LLP

(57) ABSTRACT

Methods, devices, systems, and computer-readable media for supporting position estimation are disclosed. A method at a first user equipment (UE) device may comprise sending or receiving, via a sidelink channel, a ranging signal between the first UE device and a second UE device. The method may further comprise obtaining at least one ranging measurement based on the sending or receiving the ranging signal between the first UE device and a second UE device. The method may further comprise broadcasting, via the sidelink channel, (1) the at least one ranging measurement with a reference to the second UE device or (2) a position estimate for the first UE device based on the at least one ranging measurement.

30 Claims, 11 Drawing Sheets

POSITION ESTIMATION USING INTER-PUE SIGNALING

BACKGROUND

The technology discussed below relates generally to wireless communication networks, and more particularly, to position estimation using signaling between user equipment (UE) devices. Wireless communication between devices may be facilitated by various network configurations. In one configuration, a cellular network may enable user equipment to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

One example of a sidelink wireless communication network is a vehicle-to-everything (V2X) communication network. V2X communication involves the exchange of information not only between vehicles themselves, but also between vehicles and external systems, such as streetlights, buildings, pedestrians, and cellular communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

Often, a vehicle may need to estimate the position of one or more vulnerable road users (VRUs), e.g., pedestrians, bicyclists, etc., in order to effectively apply safety measures such as collision avoidance, early warning to the driver, etc. However, available position estimates for pedestrian user equipment (PUE) may not be sufficiently accurate or reliable. There is a need for improved position estimation for UE devices.

BRIEF SUMMARY

Methods, devices, systems, and computer-readable media for supporting position estimation are disclosed. A method at a first user equipment (UE) device may comprise sending or receiving, via a sidelink channel, a ranging signal between the first UE device and a second UE device. The method may further comprise obtaining at least one ranging measurement based on the sending or receiving the ranging signal between the first UE device and a second UE device. The method may further comprise broadcasting, via the sidelink channel, (1) the at least one ranging measurement with a reference to the second UE device or (2) a position estimate for the first UE device based on the at least one ranging measurement.

A first user equipment (UE) device in a wireless communication network may comprise a wireless transceiver, a memory, and a processor communicatively coupled to the wireless transceiver and the memory. The processor may be configured to send or receive, using the wireless transceiver via a sidelink channel, a ranging signal between the first UE device and a second UE device. The processor and the memory may further be configured to obtain at least one ranging measurement based on the sending or receiving the ranging signal between the first UE device and a second UE device. The processor may further be configured to broadcast, using the wireless transceiver via the sidelink channel, (1) the at least one ranging measurement with a reference to the second UE device or (2) a position estimate for the first UE device based on the at least one ranging measurement.

A system for supporting position estimation, at a first user equipment (UE) device, may comprise means for sending or receiving, using a sidelink channel, a ranging signal between the first UE device and a second UE device. The system may further comprise means for obtaining at least one ranging measurement based on the sending or receiving the ranging signal between the first UE device and a second UE device. The system may further comprise means for broadcasting, using the wireless transceiver via the sidelink channel, (1) the at least one ranging measurement with a reference to the second UE device or (2) a position estimate for the first UE device based on the at least one ranging measurement.

A non-transitory computer-readable medium storing instructions therein for execution by one or more processors is described. The instruction, when executed, may cause the one or more processors, at a first user equipment (UE) device, to send or receive, via a sidelink channel, a ranging signal between the first UE device and a second UE device. The instruction may cause the one or more processors to obtain at least one ranging measurement based on the sending or receiving the ranging signal between the first UE device and a second UE device. The instruction may cause the one or more processors to broadcast, via the sidelink channel, (1) the at least one ranging measurement with a reference to the second UE device or (2) a position estimate for the first UE device based on the at least one ranging measurement.

BRIEF DESCRIPTION OF THE DRAWINGS

Aspects of the disclosure are illustrated by way of example. In the accompanying figures, like reference numbers indicate similar elements.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
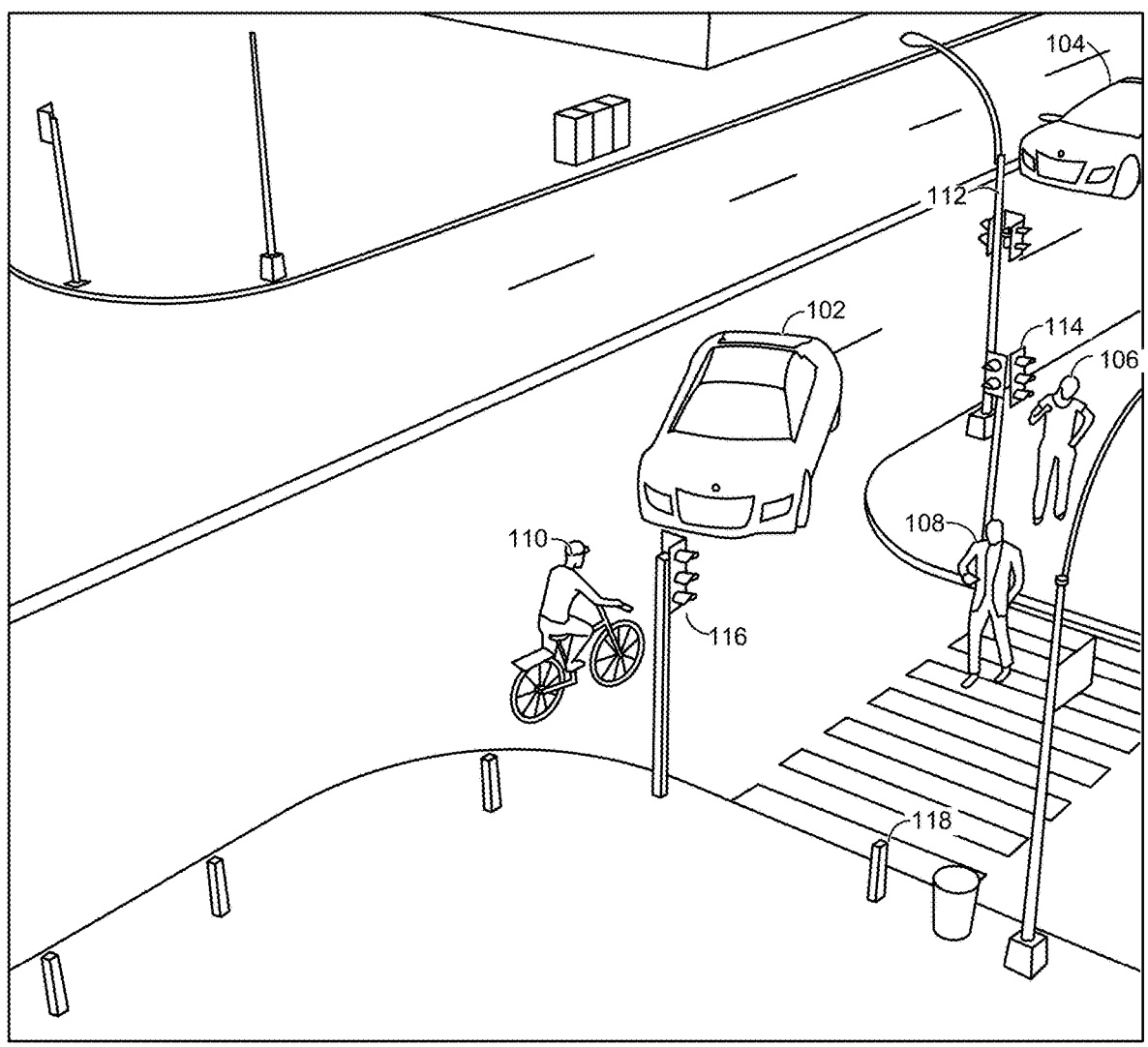
FIG. 1 shows an example of a vehicle-and-pedestrian environment 100 that may incorporate one or more embodiments of the present disclosure.

FIG. 1 shows an example of a vehicle-and-pedestrian environment 100 that may incorporate one or more embodiments of the present disclosure. As shown, environment 100 may comprise a number of different entities, including vehicles 102 and 104, pedestrians 106, 108, and 110, and infrastructure components 112 (signal light), 114 (signal light), 116 (signal light), and 118 (crosswalk sensor). Each of these entities may correspond to a user equipment (UE) device within a wireless communications network, such as a cellular network, e.g., LTE or 5G network. Typically, a UE is connected to the such a wireless communications network via a transmission reception point (TRP), such as a base station. However, a UE may also directly communication with another UE through a "sidelink" channel, which does not require communications with a TRP. For example, the various UEs may engage in vehicle-to-everything (V2X) communications with one another to implement improved road safety and traffic efficiency.

For example, the vehicle 102 may include an on-board unit (OBU) that operates as a vehicle user equipment (VUE). Similarly, the vehicle 104 may include an OBU that operates as a VUE. The pedestrian 106 walking on a sidewalk, the pedestrian 108 walking in a crosswalk, and the pedestrian 110 riding a bicycle may each carry a mobile phone that operates as a pedestrian user equipment (PUE). Infrastructure components such as the signal lights 112, 114, 116, and crosswalk sensor 118 may each includer a road-side unit (RSU) that operates as an RSU user equipment. The VUEs, PUEs, and RUEs may correspond with one another via a sidelink channel, e.g., by using V2X messages.

Certain users such as pedestrians and cyclists are particularly vulnerable to risk of physical harm associated with road usage and are referred to as vulnerable road users (VRUs). In FIG. 1, the pedestrians 106 and 108, as well the pedestrian 110 riding a bicycle, are considered VRUs. To reduce the risk of harm to VRUs, vehicles 102 and 104 may include warning and/or collision avoidance features based on the position of each VRU relative to the vehicle. For example, if a VRU (e.g., pedestrian 108 or 110) is located at a position that is dangerously close to an imminent trajectory of travel of a vehicle (e.g., vehicle 102), the vehicle may activate such warning or collision avoidance features (e.g., sound alarm to driver, apply brakes, take over steering, etc.). In order to do so, a vehicle such as vehicle 102 may need to obtain an accurate position estimate for itself as well as for each VRU, e.g., a position estimate for the PUE associated with each VRU.

However, obtaining an accurate position estimate for a PUE is often a challenging task. Generally speaking, VUEs have higher quality sensors than PUEs. A VUE may be able to accurately estimate its position based on numerous technologies. For example, the VUE associated with vehicle 102 may obtain its own position estimate by implementing position signaling techniques with RSUs such as signal lights 112, 114, and 116. The vehicle 102 may also obtain its own GNSS position estimate and, together with RSU-based positioning, derive more accurate position estimates. By contrast, a PUE may have lower-capability sensors (compared to VUEs) and thus be less equipped to obtain an accurate position estimate for itself. For example, the PUE (e.g., mobile phone) associated with pedestrian 110 may not have sensors that are sensitive enough to support position signaling with RSUs such as signal lights 112, 114, and 116, which may be too far away. Also, the accuracy of the GNSS position estimate obtained by the PUE associated with the pedestrian 110 may vary widely and may not be accurate enough to be relied on by the vehicle 102 to perform collision warning and avoidance features. As a result, the position estimate that is periodically broadcast in a basic safety message (BSM) by the PUE may be prone to errors. Typically, the BSM message is sent using V2X (e.g., pedestrian-to-vehicle (P2V)) communications. The reliability of a pedestrian's location estimate generated in such a manner is thus low. This complicates the detection and tracking of VRUs and degrades the ability to perform data association by the vehicle.

Figure 2:
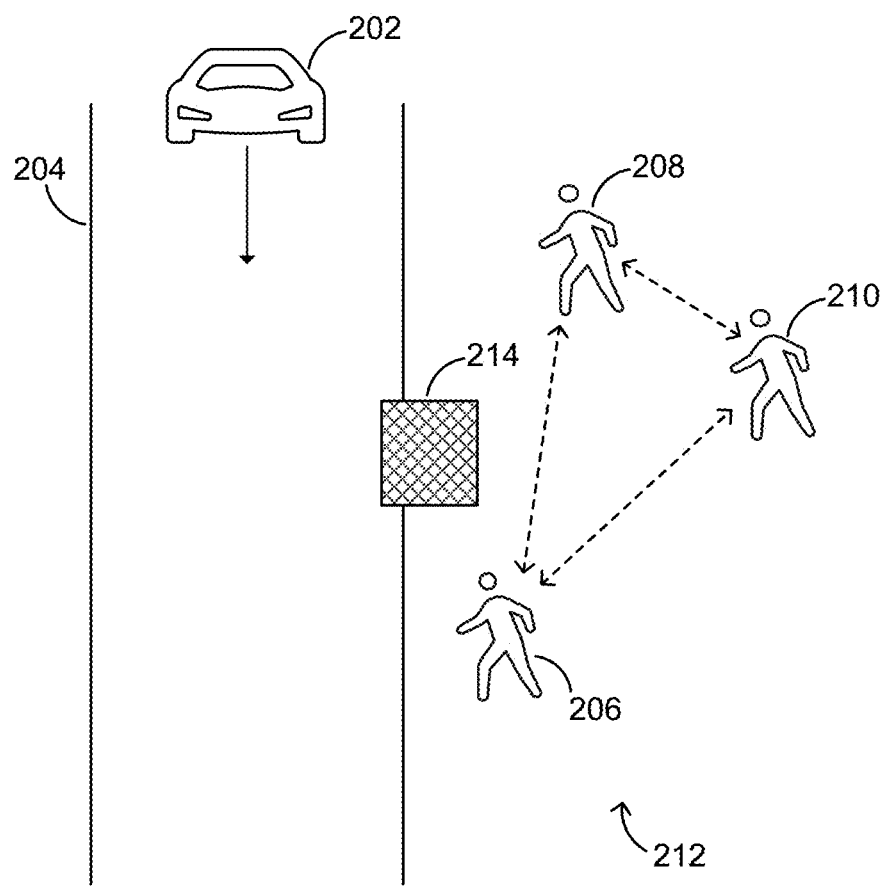
FIG. 2 illustrates an example of performing position estimation using inter-pedestrian signaling, according to an embodiment of the disclosure.

FIG. 2 illustrates an example of performing position estimation using inter-pedestrian signaling, according to an embodiment of the disclosure. A VUE 202 may be associated with vehicle traveling down a roadway 204. A first PUE 206, a second PUE 208, and a third PUE 210 may be associate with respective pedestrians who may be standing or walking on a sidewalk 212 adjacent to the roadway 204. The VUE 202 is attempting to obtain a position estimate for the first PUE 206. For example, the VUE 202 may be aware that the PUE 206 is located in the vicinity, having received a BSM message from the PUE 206. The BSM message may have contained an initial position estimate for the PUE 206 based, e.g., on GNSS signals. However, as discussed previously, such position estimate for the PUE 206 based on GNSS signals (or RSU signals) may not be sufficiently accurate or reliable. As such, the VUE 202 may attempt to obtain a more accurate position estimate for PUE 206, to use as an input for triggering safety features such as warnings and collision avoidance operations. In order to do so, the VUE 202 attempts to perform a positioning technique based on sending or receiving positioning signals directly with the PUE 206.

As shown in FIG. 2, a blockage 214 blocks a line of sight (LOS) path between the VUE 202 and the PUE 206. The blockage 214 may comprise a structure such as a small building, vendor kiosk, utility box, concrete wall, or another type of obstruction. The blockage 214 blocks a positioning signal from being transmitted directly along the LOS path between the VUE 202 and the PUE 206. This may preclude positioning techniques such as round-trip time (RTT) and angle of arrival (AoA) from being properly performed between the VUE 202 and the PUE 206. There may be multipath versions of a positioning signal that reflect off buildings or other objects to reach around the blockage 214. However, positioning estimates, e.g., based on RTT, AoA, etc., utilizing such multipath signals may yield inaccurate results.

The VUE 202 may recognize that it does not have a LOS path to the PUE 206, based on its inability to associate the PUE 206. The VUE 202 may receive broadcast BSM messages from multiple VRU, including PUEs 206, 208, and 210. The VUE 202 may then attempt to associate each VRU for which a BSM message is received with an object that the VUE 202 has detected from images captured by its camera(s), LIDAR, and/or other onboard sensors. The VUE 202 may successfully associate the PUEs 208 and 210, having detected them from captured camera/LIDAR images. However, the VUE 202 may fail to associate the PUE 206, which may not appear in any camera/LIDAR images, because the blockage 214 has obstructed the PUE 206 from view. The VUE 202 may conclude, based on its failure to associate the PUE 206, that there is no LOS path between the VUE 202 and the PUE 206.

Inter-PUE signaling may allow the VUE 202 to obtain a position estimate for the PUE 202, even when there is no LOS path between the VUE 202 and the PUE 206. For example, the VUE 202 may request that the PUE 208 and the PUE 210 provide ranging measurements with respect to each other, as well as ranging measurements between each of them and the PUE 206. FIG. 2 shows some ranging measurements that may be obtained based on inter-PUE signaling, e.g., (1) signaling between PUEs 208 and 210, (2) signaling between PUEs 208 and 206, and (3) signaling between PUEs 210 and 206. Here, a "ranging measurement" refers to a measurement obtained by a device in connection with transmitting and/or receiving one or more ranging signals. A ranging measurement may comprise one or more of: (1) a distance measurement, (2) an angle of arrival (AoA) measurement, (3) a time difference of arrival (TDOA) measurement, (4) a speed measurement associated with the first UE device, and/or (5) a time of measurement. By utilizing ranging measurements obtained based on such inter-PUE signaling, the VUE 202 may be able to obtain an accurate position estimate for the PUE 206, despite the lack of a LOS path between the VUE 202 and the PUE 206.

Figure 3:
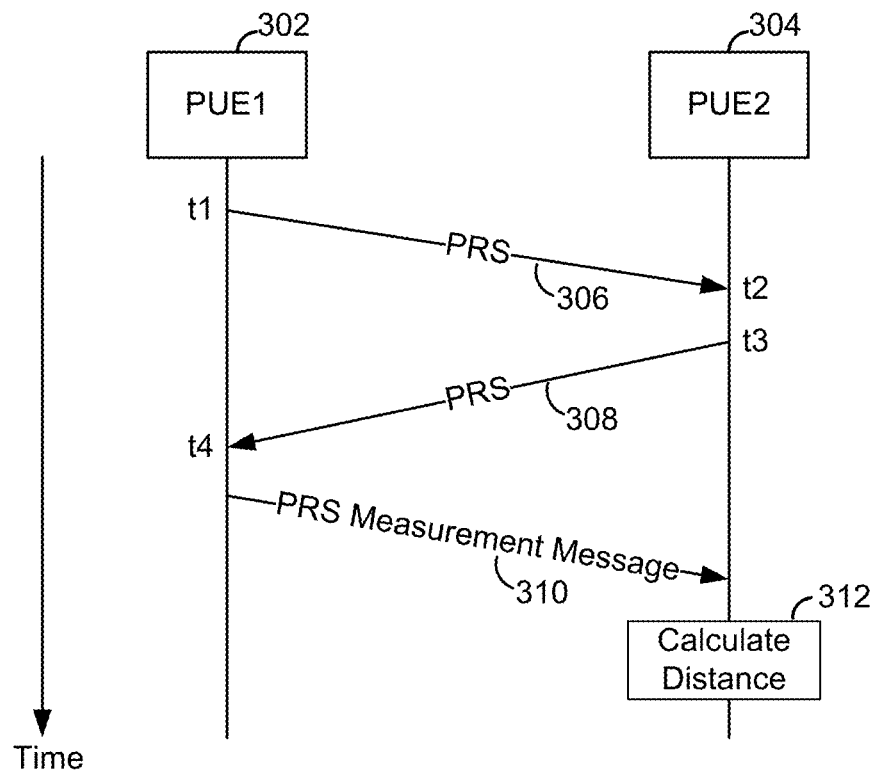
FIG. 3 illustrates a round-trip time (RTT) distance measurement, as a specific example of a ranging measurement.

FIG. 3 illustrates a round-trip time (RTT) distance measurement, as a specific example of a ranging measurement. Here, the RTT distance measurement involves the exchange of positioning reference signals (PRS) 306 and 308 between a first PUE 302 and a second PUE 304. The PUEs 302 and 304 may correspond to, for example, (1) PUEs 208 and 210, (2) PUEs 208 and 206, or (3) PUEs 210 and 206 shown in FIG. 2. While PRS signals are used in this example, other types of reference signals may be used to implement the RTT measurement. The PRS signal 306 represents propagation of a signal in one direction, from PUE 302 to PUE 304. The PRS signal 308 represents propagation of a signal in the opposite direction, from PUE 304 to PUE 302, thus completing the round trip. In the example shown in FIG. 3, time is illustrated in the vertical direction to depict the transmission and reception of signals over time.

For example, the PUE 302 broadcasts the first PRS 306 over the sidelink channel at an initial time (t1). The first PRS 306 may include, for example, a PRS sequence. The PRS sequence may be a wideband random sequence that is broadcast over an unlicensed frequency band. In some examples, the PRS may include a sequence identifier (ID) identifying the PRS sequence. The first PRS 306 may be received at the PUE 304 at a second time (t2) subsequent to t1. In response, the PUE 304 broadcasts a second PRS 308 over the sidelink channel at a third time (t3), which is received at the PUE 302 at a fourth time (t4). Thus, the RTT measurement comprises the first propagation time, (t2−t1), and the second propagation time, (t4−t3). That is, RTT=(t2−t1)+(t4−t3), which can be re-arranged as RTT=(t4−t1)−(t3−t2). The PUE 304 can locally determine the time difference (t3−t2). The PUE 302 can locally determine the time difference (t4−t1). These two time differences can be combined at the PUE 302, at the PUE 304, or at another location, to compute the RTT.

If the RTT is to be computed at the PUE 304, the PUE 304 may locally determine the time difference (t3−t2) and receive a PRS message 310 from the PUE 302 that includes, as a payload, the time difference (t4−t1). The PRS message may include other information as well. As shown in FIG. 3, the PUE 302 transmits a PRS measurement message including various positioning information to the PUE 304 over the sidelink channel. For example, the positioning information included in a payload of the PRS measurement message may include the time of departure (t1) of the first PRS and the time of arrival (t4) of the second PRS (either individually as t1 and t4 or as a time difference (t4−t1)). Other positioning information may include the PRS sequence ID, clock error noise standard deviation of the PUE 302, clock drift standard deviation of the PUE 302, location of the PUE 302 and other suitable information. Thus, at 312, the PUE 304 may calculate the RTT based on the positioning information included in the PRS measurement message, the time of arrival (t2) of the first PRS, the time of departure (t3) of the second PRS, and the clock error (e.g., clock drift standard deviation and clock error noise standard deviation) of the PUE 304 determined using its own Kalman filter. For example, if multiple RTT measurements are made, the nth RTT may be expressed as:

$$z_n = (t_4 - t_3) + (t_2 - t_1) = \frac{\|r - x(t_n)\|}{v_{light}} + \alpha, \quad \text{(Equation 1)}$$

where $v_{light}$ is the speed of light, $\alpha$ is an adjustment parameter based on the clock error of the PUE 302 and PUE 304, r is the location of the PUE 302 and x is unknown. The distance $\|r-x(t_n)\|$ may be computed from the values t1, t2, t3, t4, $v_{light}$, and $\alpha$. The RTT two-way signal exchange described above is just one type of a ranging signal that may be transmitted and/or received between devices, e.g., two PUEs, to produce a ranging measurement. Other types of ranging signals may include one-way ranging signals as well as other two-way ranging signals. For example, an angle-of-arrival (AoA) ranging signal may involve a two-way signal or only a one-way signal. An AoA signal may be received by a PUE using an antenna array, which may generate directionality information regarding the signal received. An AoA measurement may thus be generated.

Figure 4:
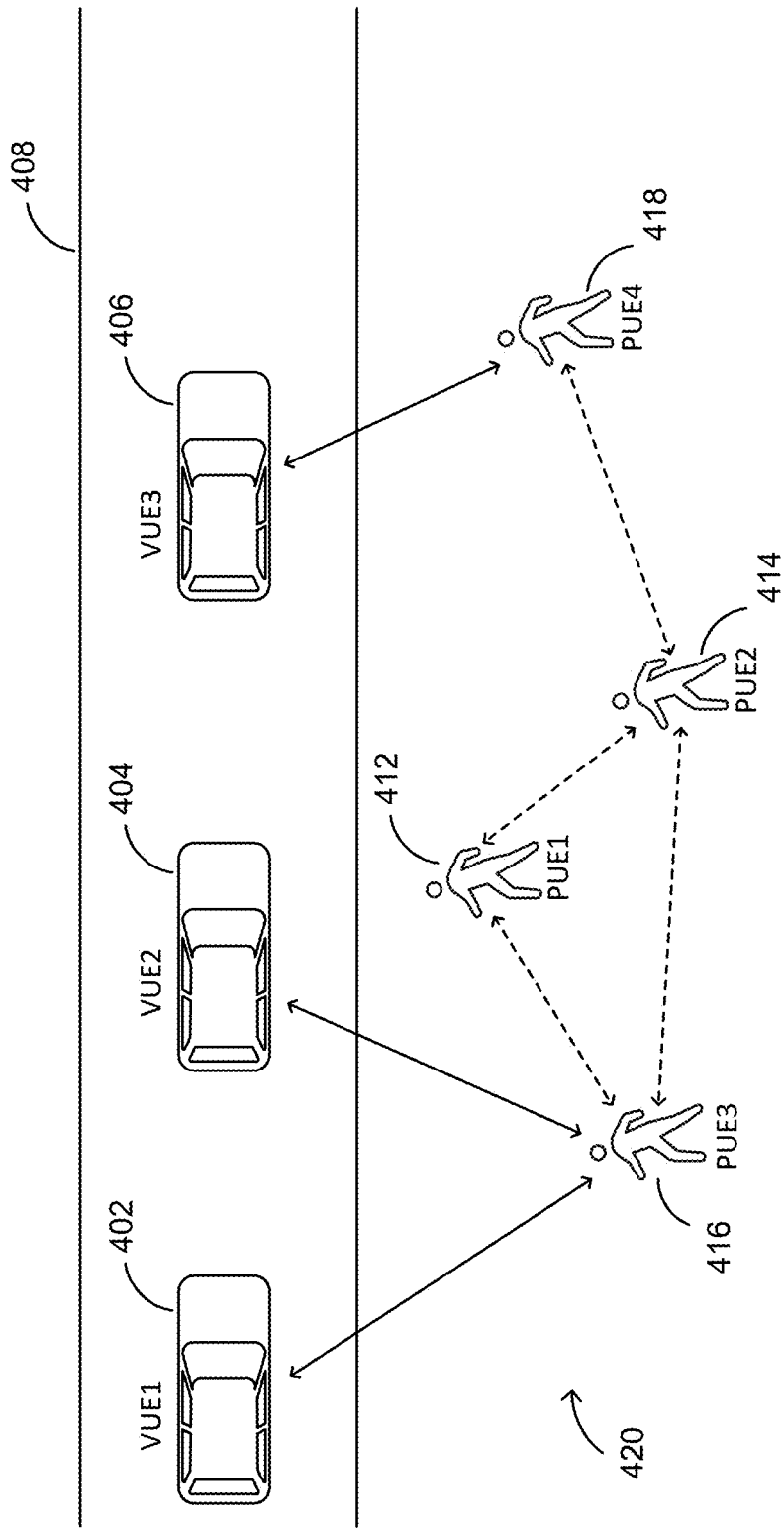
FIG. 4 illustrates an example demonstrating various techniques for obtaining and broadcasting position estimates and/or ranging measurements based on inter-PUE signaling.

FIG. 4 illustrates an example demonstrating various techniques for obtaining and broadcasting position estimates and/or ranging measurements based on inter-PUE signaling. Here, a first VUE 402, a second VUE 404, and a third VUE 406 associated with different vehicles are traveling along a road 408. A first PUE 412, a second PUE 414, a third PUE 416, and a fourth PUE 418 may be associated with different pedestrians who are standing or walking on a sidewalk 420. Inter-PUE (PUE-PUE) ranging signals (shown in dashed arrows), VUE-PUE ranging signals (shown in sold arrows), or a combination of inter-PUE and VUE-PUE ranging signals may be used to obtain ranging measurements, which can be used to compute location estimates for various PUEs. The inter-PUE and VUE-PUE ranging signals may be communicated using a sidelink channel.

In one embodiment, a PUE obtains and broadcasts its own position estimate. The position estimate may be based on one or more inter-PUE ranging signals sent to and/or received from other PUEs (and possibly VUE-PUE ranging signals sent to and/or received from VUEs). For example, the third PUE 416 may send requests to the first PUE 412 and the second PUE 414 to exchange RTT ranging signals. The first PUE 412 and the second PUE 414 may each send a response accepting the request. The requests and responses may be sent over the sidelink channel. Then, the third PUE 416 proceeds to exchange RTT ranging signals with the first PUE 412 and the second PUE 414. Based on the ranging signals, the third PUE 416 obtains RTT ranging measurements. The RTT ranging measurements may comprise RTT time or distance measurements between the third PUE 416 and the first PUE 412, as well as RTT time or distance measurements between the third PUE 416 and the second PUE 414. The third PUE 416 then uses the inter-PUE ranging measurements to generate its own position estimate. In addition to inter-PUE ranging measurements, the third PUE 416 may also use VUE-PUE ranging measurements to generate the position estimate. For example, the third PUE 416 may also obtain RTT measurements made with the first VUE 410, as well as RTT measurements made with the second VUE 404. These VUE-PUE ranging measurements can also be taken into account in computing the position estimate for the third PUE 416. While RTT is described here as an example, other types of ranging measurements may be used, such as AoA, TDOA, speed of the PUE, time of measurement, etc.

The third PUE 416 then broadcasts its position estimate. The broadcast may be performed using a V2X (e.g., P2V) communications, such as a BSM message, over the sidelink channel. The BSM message broadcast by the third PUE 416 may be received by all VUEs (e.g., the first VUE 402, the second VUE 404, and the third VUE 406) and all other PUEs (e.g., the first PUE 412, second PUE 414, and fourth PUE 418) within reception range. Here, the sidelink channel may refer to a contiguous or non-contiguous spectrum (e.g., unlicensed spectrum) that may comprise different sub-bands. While ranging signals and BSM messages are both described herein as being sent over the sidelink channel, various ranging signals and BSM messages may be sent over the same or different portions or sub-bands of such a spectrum.

In another embodiment, a PUE obtains and broadcast its ranging measurements. The ranging measurements may comprise, for example, values relating to RTT distance or time, AoA, TDOA, speed of the PUE, time of measurement, etc. Another entity (e.g., a VUE) that receives the ranging measurements may compute the position estimate for the PUE. In doing so, the other entity may also take into account ranging measurements received from one or more other PUEs. As discussed previously, each session of ranging signal transmission may be arranged by a request and a response. For example, the first PUE 412 may send a request to the second PUE 414 and the third PUE 416, which may each send a response accepting the request back to the first PUE 412. The first PUE 412 may then send a ranging signal to, and/or receive a ranging signal from, each of the second PUE 414 and the third PUE 416. The ranging signals sent between the PUES may comprise, e.g., RTT signals. Thus, the first PUE 412 may obtain RTT time or distance measurements between the first PUE 412 and the second PUE 414, as well as RTT time or distance measurements between the first PUE 412 and the third PUE 416. The first PUE may then broadcast its inter-PUE ranging measurements. The broadcast may be performed using V2X (e.g., P2V) communications, such as a BSM message, over the sidelink channel. The BSM message broadcast by the first PUE 412 may be received by all VUEs (e.g., the first VUE 402, the second VUE 404, and the third VUE 406) and all other PUEs (e.g., the second PUE 414, third PUE 416, and fourth PUE 418) within reception range.

More than one PUE may perform such operations to obtain and broadcast ranging measurements. For example, the second PUE 414 may also send a ranging signal to, and/or receive a ranging signal from, other PUEs, such as the first PUE 412, the third PUE 416, and the fourth PUE 418. Each session of ranging signal transmission may also be arranged by a request and a response. For example, the second PUE 414 may send a request to the first PUE 412, the third PUE 416, and the fourth PUE 418, which may each send a response accepting the request back to the second PUE 414. The second PUE 414 may then send a ranging signal to, and/or receive one or more ranging signals from, each of the first PUE 412, the third PUE 416, and the fourth PUE 418. Again, while RTT is described here as an example, other types of ranging measurements may be used, such as AoA, TDOA, speed of the PUE, time of measurement, etc. The second PUE may then broadcast its inter-PUE ranging measurements, e.g., using a BSM message. The BSM message broadcast by the second PUE 412 may be received by all VUEs (e.g., the first VUE 402, the second VUE 404, and the third VUE 406) and all other PUEs (e.g., the first PUE 412, third PUE 416, and fourth PUE 418) within reception range. In addition to ranging measurements, a PUE may also broadcast its rough position estimate based on other sensor readings, such as GNSS signals or RSU signals.

An entity that receives the ranging measurements broadcast by one or more PUEs may utilize the range measurements to generate a position estimate for a particular PUE. For example, the second VUE 404 may receive the BSM message broadcast by the first PUE 412 containing the range measurements made by the first PUE 412, i.e., the RTT time or distance measurements between the first PUE 412 and the second PUE 414, as well the RTT time or distance measurements between the first PUE 412 and the third PUE 416. The second VUE 404 may also receive the BSM message broadcast by the second PUE 414 containing the range measurements made by the second PUE 414, e.g., the RTT time or distance measurements between the second PUE 414 and the first PUE 412, the RTT time or distance measurements between the second PUE 414 and the third PUE 416, and the RTT time or distance measurements between the second PUE 414 and the fourth PUE 418. The second VUE 404 may then use these inter-PUE ranging measurements to generate a position estimate for a PUE, e.g., the first PUE 412.

In addition to inter-PUE ranging measurements, the second VUE 404 may also take into account VUE-PUE ranging measurements in generating the position estimate for a PUE. The first VUE 402 may make VUE-PUE ranging measurements on its own or obtain them from broadcast messages transmitted by PUEs. For example, the first PUE 412 may obtain and broadcast RTT time or distance measurements between the first PUE 412 and the first VUE 402, between the first PUE 412 and the second VUE 404, and between the first PUE 412 and the third VUE 406. The second VUE 404 may obtain such VUE-PUE ranging from broadcast messages and incorporate them in the PUE position estimate. Thus, an entity (e.g., the second VUE 404) may use both inter-PUE ranging measurements and VUE-PUE ranging measurements in generating the position estimate for a PUE (e.g., the first PUE 412).

Regardless of whether a PUE broadcasts its position estimate or broadcast its range measurements, the PUE may need to select one or more other PUEs for range signaling.

That is, the PUE may need to select other PUEs with which to send or receive ranging signals, then send a request to send and/or receive ranging signals with the selected PUE(s). The requester UE may make such a selection autonomously. In some embodiments, the selection is based on distance. The requester PUE may have a rough estimate of the position of each candidate PUE for range signaling. As discussed previously, each PUE may already broadcast its position estimate, which may be based on GNSS signals or RSU signals and may not be highly accurate or reliable. Nevertheless, these available position estimates may be used by a PUE in selecting one or more other PUEs for range signaling. Based on the rough position estimates for itself and the candidate PUEs, the requester PUE may determine an approximate distance, d, separating itself and each candidate PUE. The distance d may then be used to select one or more PUEs for range signaling.

In one specific embodiment, the PUE selects those PUEs associated with a distance, d, that is greater than a minimum distance d1 and less than a maximum distance d2. That is, the PUE may select the PUEs having a distance d that satisfies the condition:

$$d1 < d < d2 \quad \text{(Equation 2)}$$

Selecting PUEs that satisfy such a distance criterion for range signaling may achieve numerous benefits. By selecting only PUEs that are greater than a minimum distance d1 away, PUEs that are too close for proper range signaling based on RTT, AoA, TDOA, etc., or PUEs that are crowded around the requester PUE may be removed from consideration. By selecting only PUEs that are less than the minimum distance d2 away, PUEs that are too far for proper range signaling based on RTT, AoA, TDOA, etc. may also be removed from consideration. Sometimes, an area such as a sidewalk may be crowded, with many pedestrians and associated PUEs congregating en masse. In such situations, use of the minimum distance d1 and maximum distance d2 may help to reduce the number of candidate PUEs for range signaling, by selecting only those PUEs which meet the distance criterion expressed in Equation 2. The values of d1 and d2 may also be dynamically adjusted. For example, if a large number of candidate PUEs are sensed (e.g., based on received BSMs), the requester PUE may increase the value of d1 and/or decrease the value of d2, to narrow the range of acceptable distance values. Doing so tightens the distance-based selection criterion in an area crowded with a large number of candidate PUEs. On the other hand, if a small number of candidate PUEs are sensed (e.g., based on received BSMs), the requester PUE may decrease the value of d1 and/or increase the value of d2, to widen the range of acceptable distance values. Doing so loosens the distance-based selection criterion in an area with sparsely occupied with a small number of candidate PUEs.

In another embodiment, the requester PUE may select PUEs for signal ranging based on randomization. For example, the requester PUE may randomly select a certain number, N, of PUEs, from all the candidate PUEs, for range signaling. The number N may be determined prior to the selection process. Such a randomized approach may reduce the complexity of the selection algorithm, by reducing and potentially eliminating distance or other computations based on rough location estimates reported by candidate PUEs (e.g., GNSS positions), which may be inaccurate or unreliable anyways. In yet another embodiment, the requester PUE may select PUEs for range signaling based on a combination of the aforementioned techniques. Just as an example, the requester PUE may first employ the distance criterion expressed in Equation 2 to reduce the number of candidate PUEs. Then, the requester PUE may randomly select N PUEs from the reduced set of candidate PUEs for purposes of range signaling.

Alternatively or additionally, another entity (e.g., a VUE) may request that a PUE select one or more other PUEs with which to send or receive ranging signals. In one embodiment, a VUE may make such the request in order to reconcile the location of certain PUEs for which the VUE has high location uncertainty. For example, a VUE may make a request to a first PUE to perform range signaling with a second PUE and a third PUE. In such a case, the VUE may be viewed as the primary requester. The first PUE, having received the request for the VUE to perform range signaling with the second PUE and the third PUE, may send a request to the second PUE and a request to the third PUE for range signaling. The second PUE and the third PUE may each send a response to the first PUE to accept the request. Here, the first PUE may be viewed as the secondary requester. The first PUE may then proceed to transmit and/or receive ranging signals to and/or from the second PUE and third PUE and obtain ranging measurements. The first PUE may then broadcast (1) its position estimate based on the ranging measurements or (2) the ranging measurements, in a manner similar to that describe previously.

Figure 5:
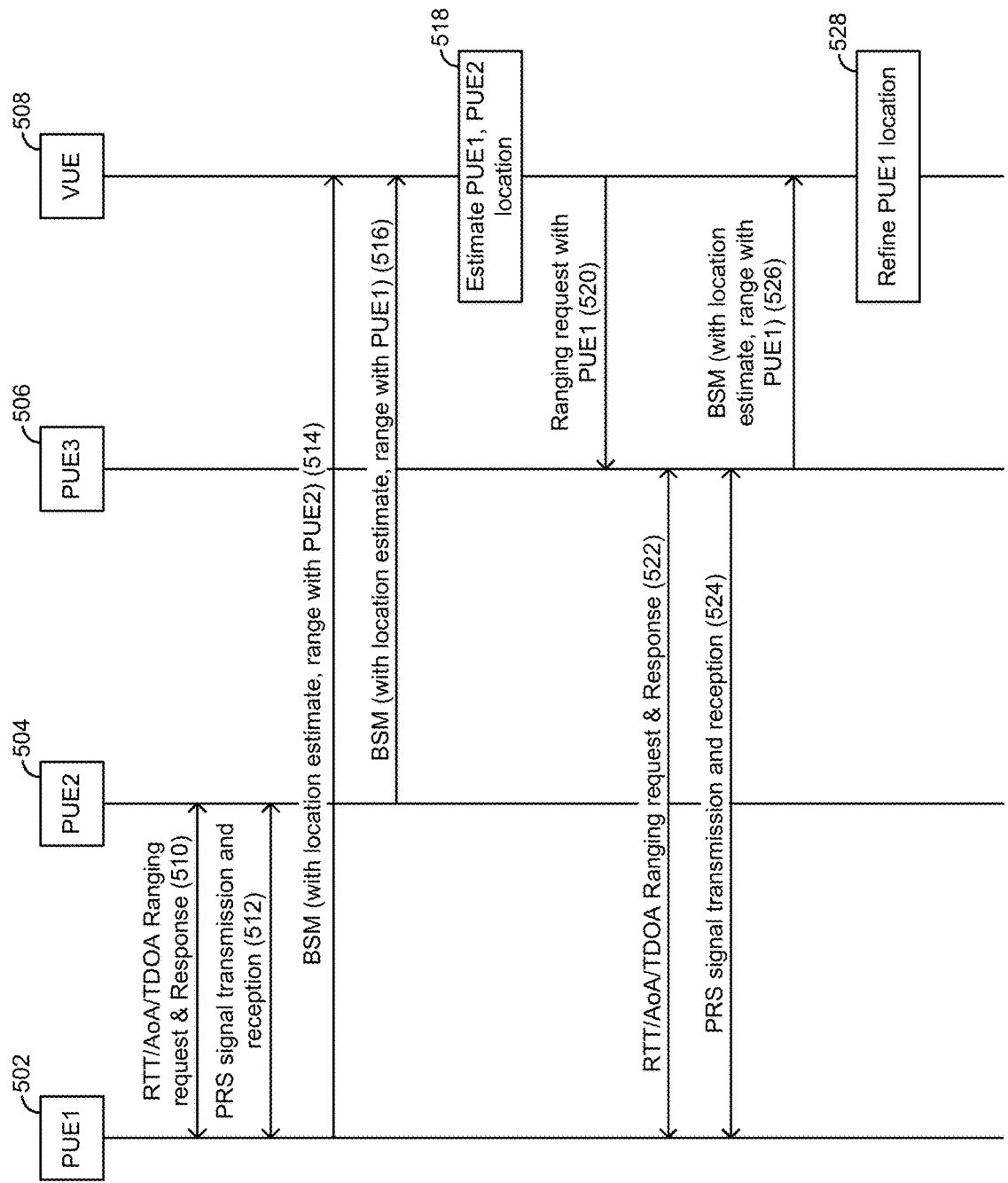
FIG. 5 illustrates an example of an exchange of signals and messages that allows a VUE to refine a position estimate for a PUE by leveraging inter-PUE range signaling.

FIG. 5 illustrates an example of an exchange of signals and messages that allows a VUE to refine a position estimate for a PUE by leveraging inter-PUE range signaling. Here, a first PUE 502, a second PUE 504, a third PUE 506, and a VUE 508 are shown. The VUE 508 may obtain a rough position estimate for each of the PUEs 502, 504, and 506. The VUE 508 may do so by extracting GNSS-based position estimates contained in broadcast BSM messages from each PUE. However, as discussed previously, such rough position estimates may not be sufficiently accurate or reliable.

Referring to FIG. 5, at 510, the first PUE 502 and the second PUE 504 may exchange a ranging signal request and a response. Either PUE may be the requester or responder. For example, the first PUE 502 may send a request to the second PUE 504 to perform range signaling. The second PUE 504 may send a response back to the first PUE 502 to accept the request. Alternatively, it may be the second PUE 504 that sends a request for range signaling to the first PUE 502, which may respond by sending a response to the second PUE 504 to accept the request. At 512, one or more ranging signals, e.g., PRS signals, are transmitted between the first PUE 502 and the second PUE 504. For example, the exchange of RTT signals described with respect to FIG. 3 may be used. The first PUE 502 and/or the second PUE 504 may obtain ranging measurements, based on the transmission and/or reception of the one or more ranging signals.

At 514, the first PUE 502 may broadcast the ranging measurements, e.g., RTT distance or time measurements, obtained based on ranging signals between the first PUE 502 and the second PUE 504. As discussed, the ranging measurements may be included in a BSM message, e.g., as part of V2X (e.g., P2V) communications, that is broadcast by the first PUE 502. In addition to the ranging measurements, the BSM message may also contain the latest rough position estimate, e.g., GNSS position, for the first PUE 502. The VUE 508 may receive the BSM message and extract the ranging measurements between the first PUE 502 and the second PUE 504, as well as the rough position estimate for the first PUE 502.

Alternatively or additionally, at 516, the second PUE 504 may broadcast the ranging measurements, e.g., RTT distance or time measurements, obtained based on ranging signals between the first PUE 502 and the second PUE 504. The ranging measurements may be included in a BSM message, e.g., as part of V2X (e.g., P2V) communications, that is broadcast by the second PUE 504. The BSM message may also contain the latest rough position estimate, e.g., GNSS position, for the first PUE 504. The VUE 508 may receive the BSM message and extract the ranging measurements between the first PUE 502 and the second PUE 504, as well as the rough position estimate for the second PUE 504.

At 518, the VUE 508 may attempt to estimate the position (e.g., location) of the first PUE 502 and the second PUE 504. The VUE 508 may do so based on the ranging measurements received from the first PUE 502, the ranging measurements received from the second PUE 504, the rough position estimate for the first PUE 502, and/or the rough position estimate for the second PUE 504. However, in this example, the VUE 508 fails to determine position estimates for the first PUE 502 and the second PUE 504. The VUE 508 may determine that such a failure has occurred based on an inability to determine each position estimate, to certain degree of certainty. This may correspond to a failure to reconcile different ranging measurements and/or position estimates for a particular PUE. Just as an example, the VUE 508 may decide that the ranging measurements broadcast by the first PUE 502, the ranging measurements broadcast by the second PUE 504, and/or the rough position estimate for the first PUE 502 are so contradictory that no reliable position estimate for the first PUE 502 can be declared.

At 520, in response to the failure to determine a position estimate for the first PUE 502 and the second PUE 504 described above, the VUE 508 may send a request to the third PUE 506, for the third PUE 506 to conduct range signaling with the first PUE 502 and the second PUE 504. Here, the VUE 508 may be viewed as the primary requester. The request may specify the third PUE 506, which may be viewed as a secondary requester. The request may further specify the first PUE 502 and the second PUE 504, as the targets with which the third PUE 506 is to conduct range signaling. The request may be included in a BSM message, e.g., as part of V2X (e.g., P2V) communications, that is broadcast by the VUE 508. The third PUE 505 receives the request sent by the VUE 508.

At 522, in response to the request sent from the VUE 508, the third PUE 505 may send a request to the first PUE 502 to perform range signaling. The second PUE 504 may send a response back to the third PUE 506 to accept the request. At 524, one or more ranging signals, e.g., PRS signals, are transmitted between the third PUE 506 and the first PUE 502. For example, the exchange of RTT signals described with respect to FIG. 3 may be used. The third PUE 506 may obtain ranging measurements, based on the transmission and/or reception of the one or more ranging signals.

At 526, the third PUE 506 may broadcast the ranging measurements, e.g., RTT distance or time measurements, obtained based on ranging signals between the third PUE 506 and the first PUE 502. The ranging measurements may be included in a BSM message, e.g., as part of V2X (e.g., P2V) communications, that is broadcast by the third PUE 506. In addition to the ranging measurements, the BSM message may also contain the latest rough position estimate, e.g., GNSS position, for the third PUE 506. The VUE 508 may receive the BSM message and extract the ranging measurements between the third PUE 506 and the first PUE 502, as well as the rough position estimate for the third PUE 506.

In addition (not shown in FIG. 5), the third PUE 506 may also exchange a ranging request and a response, transmit and/or receive one or more ranging signals, obtain ranging measurements, and report ranging measurements in connection with the second PUE 504. A similar sequence of steps as those described above at 522, 524, and 526 for range signaling in connection with the first PUE 502 may be implemented. At 528, the VUE 508 may determine position estimates for the first PUE 502 and the second PUE 504 with greater confidence, aided by the additional ranging measurements and rough position estimate obtained with the help of the third PUE 506.

Figure 6:
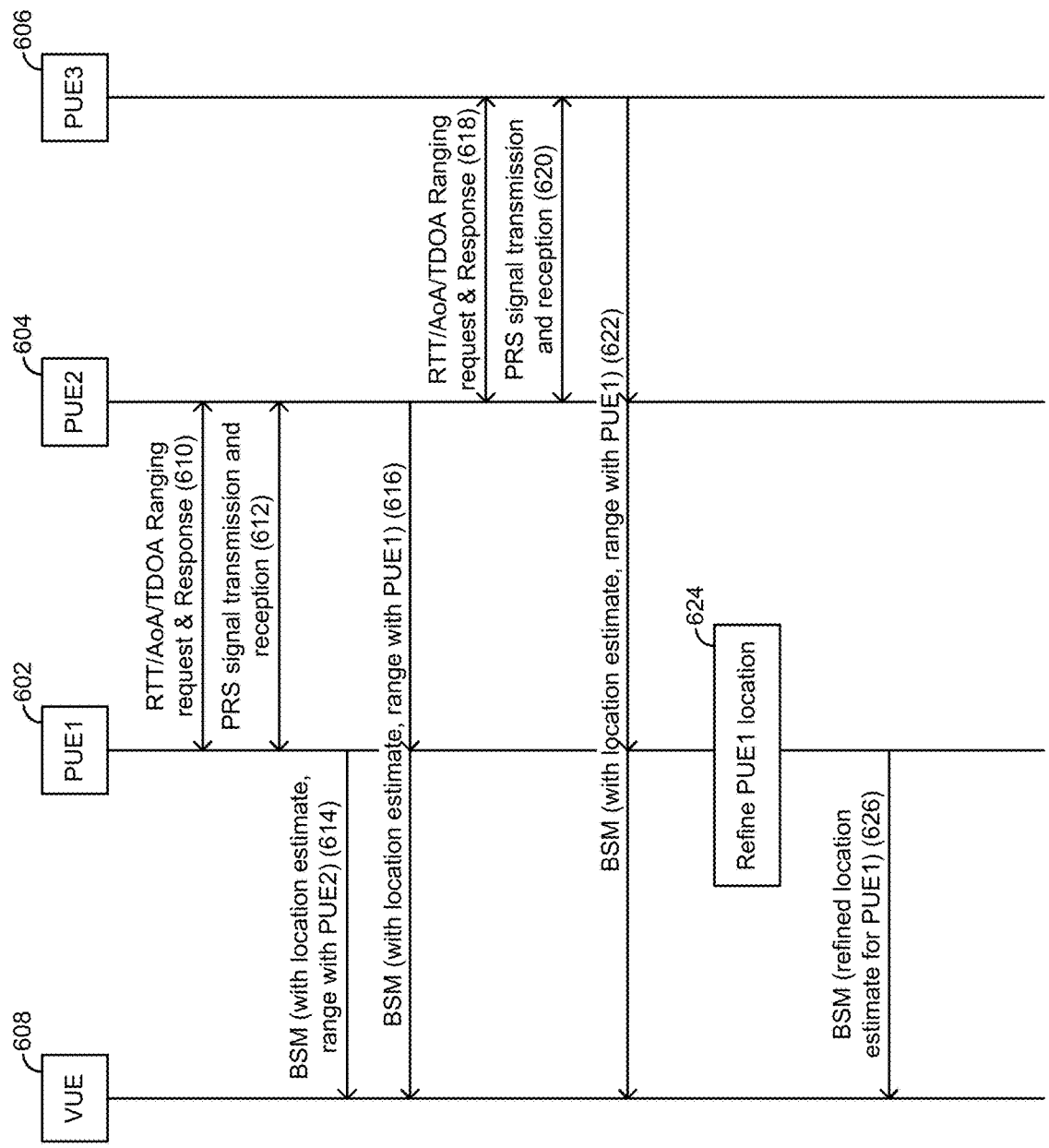
FIG. 6 illustrates an example of an exchange of signals and messages that allows a first PUE to refine a position estimate for itself by leveraging inter-PUE ranging signaling between other PUEs.

FIG. 6 illustrates an example of an exchange of signals and messages that allows a first PUE to refine a position estimate for itself by leveraging inter-PUE ranging signaling between other PUEs. Here, a first PUE 602, a second PUE 604, a third PUE 606, and a VUE 608 are shown. At 610, the first PUE 602 and the second PUE 604 may exchange a ranging signal request and a response. Either PUE may be the requester or responder. For example, the first PUE 602 may send a request to the second PUE 604 to perform range signaling. The second PUE 604 may send a response back to the first PUE 602 to accept the request. Alternatively, it may be the second PUE 604 that sends a request for range signaling to the first PUE 602, which may respond by sending a response to the second PUE 604 to accept the request. At 612, one or more ranging signals, e.g., PRS signals, are transmitted between the first PUE 602 and the second PUE 604. For example, the exchange of RTT signals described with respect to FIG. 3 may be used. The first PUE 602 and the second PUE 604 may obtain ranging measurements, based on the transmission and/or reception of the one or more ranging signals.

At 614, the first PUE 602 may broadcast the ranging measurements, e.g., RTT distance or time measurements, obtained based on ranging signals between the first PUE 602 and the second PUE 604. As discussed, the ranging measurements may be included in a BSM message, e.g., as part of V2X (e.g., P2V) communications, that is broadcast by the first PUE 602. In addition to the ranging measurements, the BSM message may also contain the latest rough position estimate, e.g., GNSS position, for the first PUE 602. The VUE 608 may receive the BSM message and extract the ranging measurements between the first PUE 602 and the second PUE 604, as well as the rough position estimate for the first PUE 602.

In addition, at 616, the second PUE 604 may broadcast the ranging measurements, e.g., RTT distance or time measurements, obtained based on ranging signals between the first PUE 602 and the second PUE 604. The ranging measurements may be included in a BSM message, e.g., as part of V2X (e.g., P2V) communications, that is broadcast by the second PUE 604. The BSM message may also contain the latest rough position estimate, e.g., GNSS position, for the first PUE 604. The first PUE 602 and the VUE 608 may each receive the BSM message and extract the ranging measurements between the first PUE 602 and the second PUE 604, as well as the rough position estimate for the second PUE 604.

At 618, the second PUE 604 and the third PUE 606 may exchange a ranging signal request and a response. Either PUE may be the requester or responder. For example, the second PUE 604 may send a request to the third PUE 606 to perform range signaling. The third PUE 606 may send a response back to the second PUE 604 to accept the request. Alternatively, it may be the third PUE 606 that sends a request for range signaling to the second PUE 604, which may respond by sending a response to the third PUE 606 to accept the request. At 620, one or more ranging signals, e.g., PRS signals, are transmitted between the second PUE 604 and the third PUE 606. For example, the exchange of RTT signals described with respect to FIG. 3 may be used. The second PUE 604 and the third PUE 606 may obtain ranging measurements, based on the transmission and/or reception of the one or more ranging signals.

At 622, the third PUE 606 may broadcast the ranging measurements, e.g., RTT distance or time measurements, obtained based on ranging signals between the second PUE 604 and the third PUE 606. As discussed, the ranging measurements may be included in a BSM message, e.g., as part of V2X (e.g., P2V) communications, that is broadcast by the third PUE 606. In addition to the ranging measurements, the BSM message may also contain the latest rough position estimate, e.g., GNSS position, for the third PUE 606. The first PUE 602, the second PUE 604, and the VUE 608 may each receive the BSM message and extract the ranging measurements between the second PUE 604 and the third PUE 606, as well as the rough position estimate for the third PUE 606.

At 624, the VUE 608 may decode the BSM message sent by the third PUE 606 and uses the following values to obtain a refined position estimate for its own position: (1) the ranging measurements between the second PUE 604 and the third PUE 606, as well as the rough position estimate for the third PUE 606, as obtained at 614, (2) the rough position estimate for the second PUE 604, as obtained at 614, (3) the ranging measurements between the first PUE 602 and the second PUE 604, as obtained at 612, and (4) the rough position estimate for the first PUE 602, as obtained from sensors, e.g., GNSS sensor/receiver, at the first PUE 602.

At 626, the first PUE 602 may determine its own position estimate with greater confidence, aided by the additional ranging measurements obtained based on the inter-PUE signaling between the second PUE 604 and the third PUE 606, as well as and rough position estimates obtained for the second PUE 604 and the third PUE 606.

Figure 7:
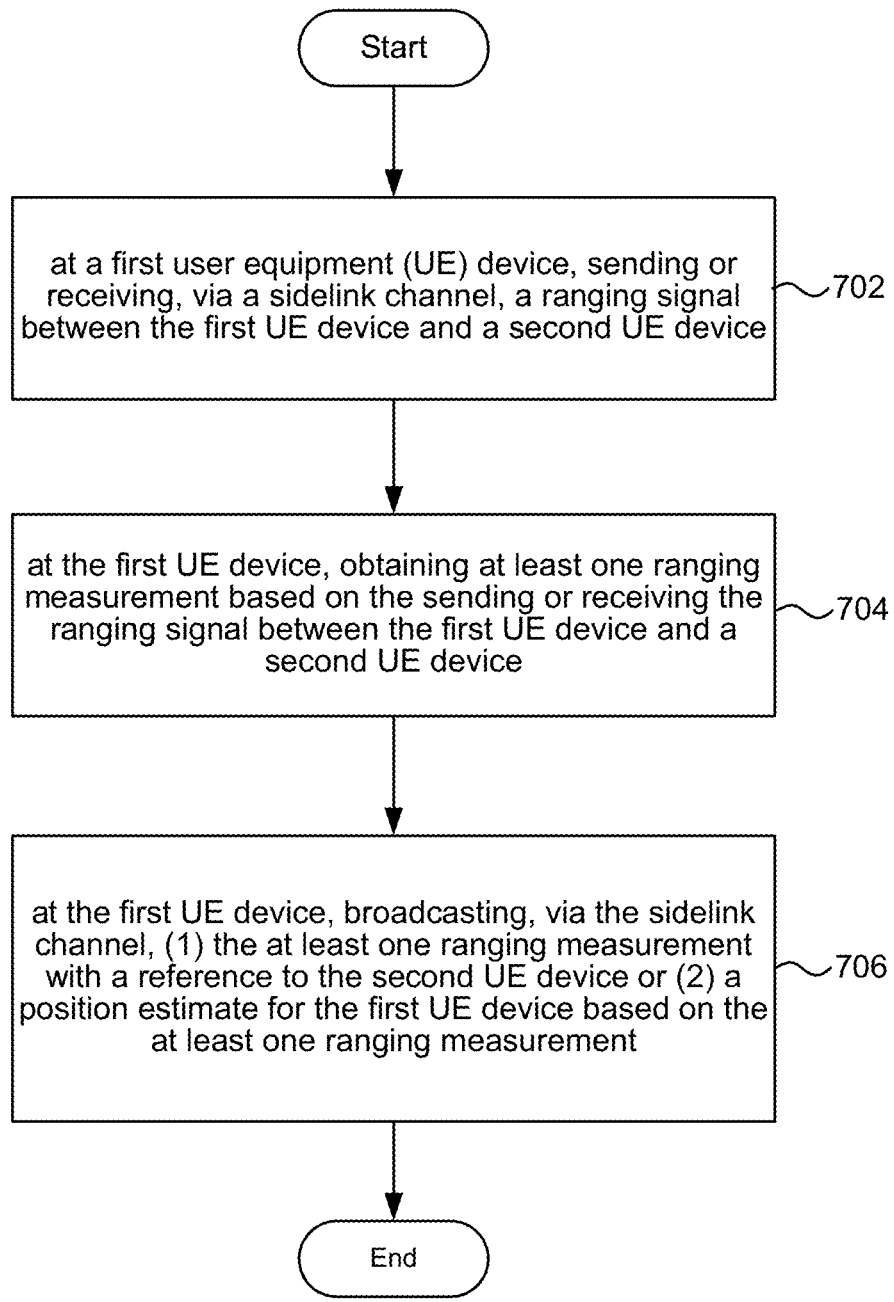
FIG. 7 is a flow diagram illustrating steps in a process 700 for supporting position estimation, according to an embodiment of the disclosure.

FIG. 7 is a flow diagram illustrating steps in a process 700 for supporting position estimation at a first user equipment (UE) device, according to an embodiment of the disclosure. At a step 702, the process involves, at the first user equipment (UE) device, sending or receiving, via a sidelink channel, a ranging signal between the first UE device and a second UE device. In one embodiment, each of the first UE device and second UE device is a pedestrian user equipment (PUE) device. Means for sending or receiving the ranging signal may comprise, for example, (as described in later sections with reference to FIG. 11) a transceiver 1120, a processor 1104, memory 1105, and computer-readable medium 1106 and instructions stored therein.

At a step 704, the process further involves, at the first UE device, obtaining at least one ranging measurement based on the sending or receiving the ranging signal between the first UE device and a second UE device. The at least one ranging measurement may comprise, for example, (1) a distance measurement, (2) an angle of arrival (AoA) measurement, (3) a time difference of arrival (TDOA) measurement, (4) a speed measurement associated with the first UE device, or (5) a time of measurement. As a specific example, the at least one ranging measurement may comprise RTT time or distance measurements. Means for obtaining the at least one ranging measurement may comprise, for example, the processor 1104, memory 1105, and computer-readable medium 1106 and instructions stored therein.

At a step 706, the process further involves, at the first UE device, broadcasting, via the sidelink channel, (1) the at least one ranging measurement with a reference to the second UE device or (2) a position estimate for the first UE device based on the at least one ranging measurement. Means for broadcasting the at least one ranging measurement or the position estimate may comprise, for example, the transceiver 1120, a processor 1104, memory 1105, and computer-readable medium 1106 and instructions stored therein. The at least one ranging measurement or position estimate may be contained in a BSM message broadcast from the first UE device, via V2X communications using the sidelink channel.

Figure 8:
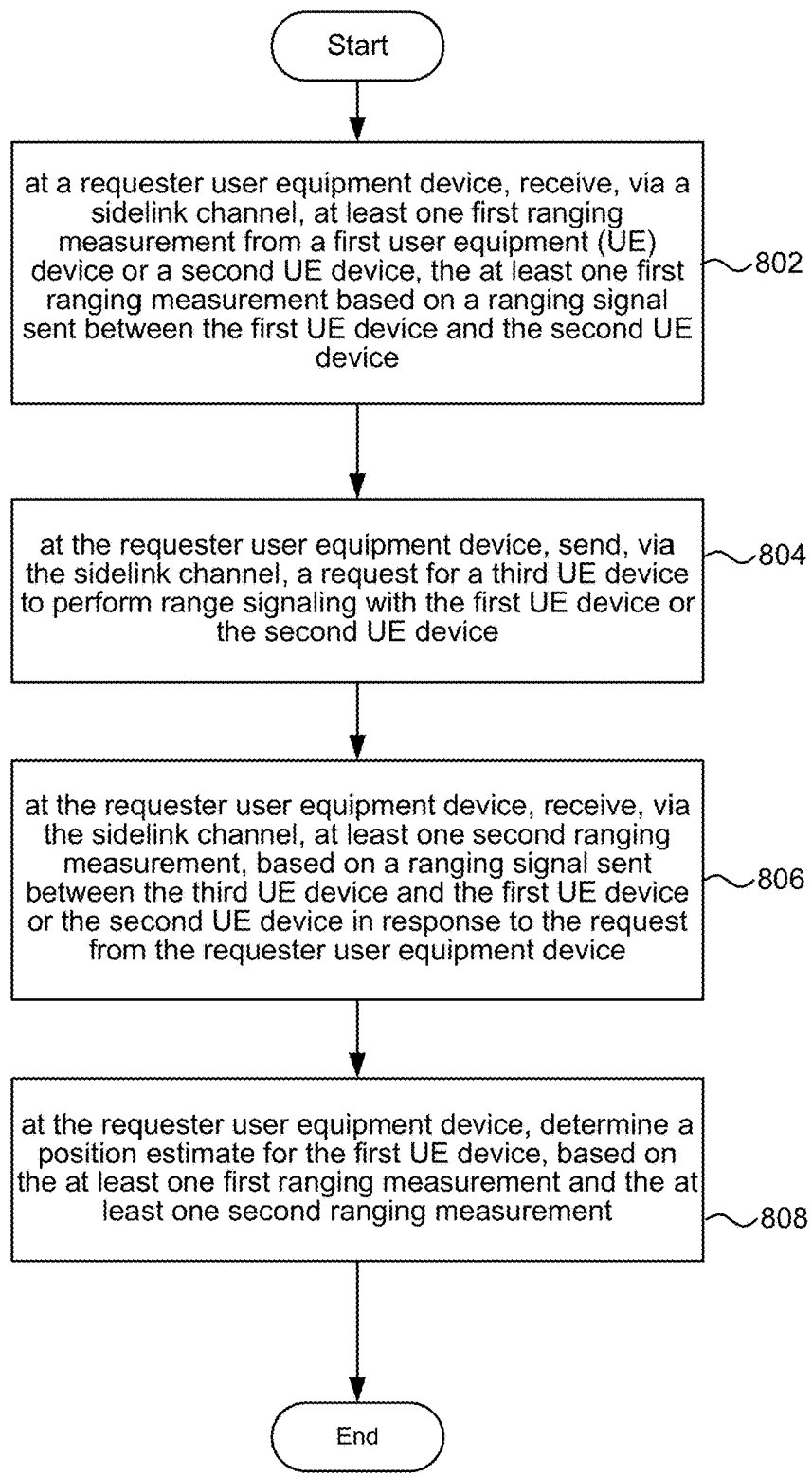
FIG. 8 is a flow diagram illustrating steps in a process for supporting position estimation at a requester user equipment device, according to an embodiment of the disclosure.

FIG. 8 is a flow diagram illustrating steps in a process 800 for supporting position estimation at a requester user equipment device, according to an embodiment of the disclosure. At a step 802, the process involves, at the requester user equipment device, receiving, via a sidelink channel, at least one first ranging measurement from a first user equipment (UE) device or a second UE device, the at least one first ranging measurement based on a ranging signal sent between the first UE device and the second UE device. In one embodiment, the requester user equipment device is a vehicle user equipment (VUE) device, and each of the first UE device and second UE device is a pedestrian user equipment (PUE) device. Means for receiving the at least one first ranging measurement may comprise, for example, (as described in later sections with reference to FIG. 11) a transceiver 1120, a processor 1104, memory 1105, and computer-readable medium 1106 and instructions stored therein.

At a step 804, the process further involves, at the requester user equipment device, sending, via the sidelink channel, a request for a third UE device to perform range signaling with the first UE device or the second UE device. Means for sending the request to the third UE device may comprise, for example, (as described in later sections with reference to FIG. 11) a transceiver 1120, a processor 1104, memory 1105, and computer-readable medium 1106 and instructions stored therein.

At a step 806, the process further involves, at the requester user equipment device, receiving, via the sidelink channel, at least one second ranging measurement, based on a ranging signal sent between the third UE device and the first UE device or the second UE device in response to the request from the requester user equipment device. Means for sending the request to the third UE device may comprise, for example, (as described in later sections with reference to FIG. 11) a transceiver 1120, a processor 1104, memory 1105, and computer-readable medium 1106 and instructions stored therein.

At a step 808, process further involves, at the requester user equipment device, determining a position estimate for the first UE device, based on the at least one first ranging measurement and the at least one second ranging measurement. Examples of ranging measurements include (1) a distance measurement, (2) an angle of arrival (AoA) measurement, (3) a time difference of arrival (TDOA) measurement, (4) a speed measurement associated with the first UE device, or (5) a time of measurement. As a specific example, a ranging measurement may comprise RTT time or distance measurements.

Figure 9:
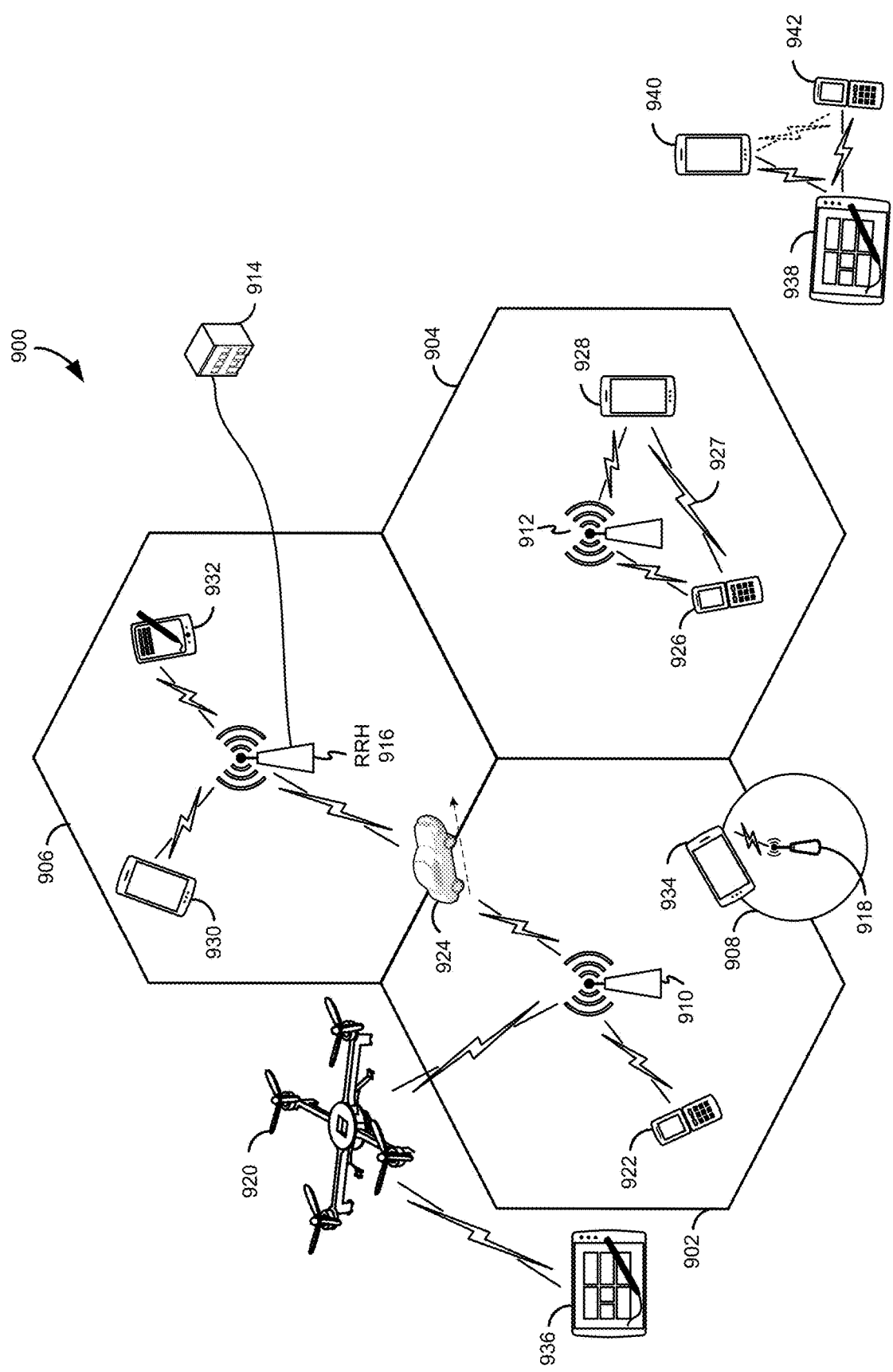
FIG. 9 depicts a schematic illustration of a radio access network.

Referring now to FIG. 9, as an illustrative example without limitation, a schematic illustration of a radio access network 900 is provided. The RAN 900 may implement any suitable wireless communication technology or technologies to provide radio access. As one example, the RAN 900 may operate according to 3rd Generation Partnership Project (3GPP) New Radio (NR) specifications, often referred to as 5G. As another example, the RAN 900 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 900 may be divided into a number of cellular regions (cells) that can be uniquely identified by a user equipment (UE) based on an identification broadcasted over a geographical area from one access point or base station. FIG. 9 illustrates macrocells 902, 904, and 906, and a small cell 908, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 9, two base stations 910 and 912 are shown in cells 902 and 904; and a third base station 914 is shown controlling a remote radio head (RRH) 916 in cell 906. That is, a base station can have an integrated antenna or can be connected to an antenna or RRH by feeder cables. In the illustrated example, the cells 902, 904, and 906 may be referred to as macrocells, as the base stations 910, 912, and 914 support cells having a large size. Further, a base station 918 is shown in the small cell 908 (e.g., a microcell, picocell, femtocell, home base station, home Node B, home eNode B, etc.) which may overlap with one or more macrocells. In this example, the cell 908 may be referred to as a small cell, as the base station 918 supports a cell having a relatively small size. Cell sizing can be done according to system design as well as component constraints. It is to be understood that the radio access network 900 may include any number of wireless base stations and cells. Further, a relay node may be deployed to extend the size or coverage area of a given cell. The base stations 910, 912, 914, 918 provide wireless access points to a core network for any number of mobile apparatuses.

FIG. 9 further includes a quadcopter or drone 920, which may be configured to function as a base station. That is, in some examples, a cell may not necessarily be stationary, and the geographic area of the cell may move according to the location of a mobile base station such as the quadcopter 920.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 900 is illustrated supporting wireless communication for multiple mobile apparatuses. A mobile apparatus is commonly referred to as a user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and/or enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 900, the cells may include UEs that may be in communication with one or more sectors of each cell. For example, UEs 922 and 924 may be in communication with base station 910; UEs 926 and 928 may be in communication with base station 912; UEs 930 and 932 may be in communication with base station 914 by way of RRH 916; UE 934 may be in communication with base station 918; and UE 936 may be in communication with mobile base station 920. Here, each base station 910, 912, 914, 918, and 920 may be configured to provide an access point to a core network (not shown) for all the UEs in the respective cells. In another example, a mobile network node (e.g., quadcopter 920) may be configured to function as a UE. For example, the quadcopter 920 may operate within cell 902 by communicating with base station 910.

Wireless communication between a RAN 900 and a UE (e.g., UE 922 or 924) may be described as utilizing an air interface. Transmissions over the air interface from a base station (e.g., base station 910) to one or more UEs (e.g., UE 922 and 924) may be referred to as downlink (DL) transmission. In accordance with certain aspects of the present disclosure, the term downlink may refer to a point-to-multipoint transmission originating at a scheduling entity (described further below; e.g., base station 910). Another way to describe this scheme may be to use the term broadcast channel multiplexing. Transmissions from a UE (e.g., UE 922) to a base station (e.g., base station 910) may be referred to as uplink (UL) transmissions. In accordance with further aspects of the present disclosure, the term uplink may refer to a point-to-point transmission originating at a scheduled entity (described further below; e.g., UE 922).

For example, DL transmissions may include unicast or broadcast transmissions of control information and/or traffic information (e.g., user data traffic) from a base station (e.g., base station 910) to one or more UEs (e.g., UEs 922 and 924), while UL transmissions may include transmissions of control information and/or traffic information originating at a UE (e.g., UE 922). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 900 may utilize one or more multiplexing and multiple access algorithms to enable simultaneous communication of the various devices. For example, 5G NR specifications provide multiple access for UL or reverse link transmissions from UEs 922 and 924 to base station 910, and for multiplexing DL or forward link transmissions from the base station 910 to UEs 922 and 924 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 910 to UEs 922 and 924 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 900 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 900, the ability for a UE to communicate while moving, independent of its location, is referred to as mobility. The various physical channels between the UE and the RAN are generally set up, maintained, and released under the control of an access and mobility management function (AMF, not illustrated) in a core network coupled to the RAN 900. In some scenarios, the AMF may include a security context management function (SCMF) and a security anchor function (SEAF). The SCMF can manage, in whole or in part, the security context for both the control plane and the user plane functionality. The SEAF can perform authentication.

In some examples, the RAN 900 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 924 (illustrated as a vehicle, although any suitable form of UE may be used) may move from the geographic area corresponding to its serving cell 902 to the geographic area corresponding to a neighbor cell 906. When the signal strength or quality from the neighbor cell 906 exceeds that of its serving cell 902 for a given amount of time, the UE 924 may transmit a reporting message to its serving base station 910 indicating this condition. In response, the UE 924 may receive a handover command, and the UE may undergo a handover to the cell 106.

In various implementations, the air interface in the RAN 900 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. An example of unlicensed spectrum includes the Intelligent Transport Systems (ITS) band in the 5.9 GHz frequency band. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 938 is illustrated communicating with UEs 940 and 942. In some examples, the UE 938 is functioning as a scheduling entity or a transmitting sidelink device, and UEs 940 and 942 may function as a scheduled entity or a receiving sidelink device. For example, UE 938 may function as a scheduling entity in a device-to-device (D2D), peer-to-peer (P2P), vehicle-to-everything (V2X), and/or in a mesh network. In a mesh network example, UEs 940 and 942 may optionally communicate directly with one another in addition to communicating with the scheduling entity 938.

In some aspects of the present disclosure, two or more UEs (e.g., UEs 926 and 928) within the coverage area of a serving base station 912 may communicate with each other using sidelink signals 927 without relaying that communication through the base station. In this example, the base station 927 or one or both of the UEs 926 and 928 may function as scheduling entities to schedule sidelink communication between UEs 926 and 928. For example, UEs 926 and 928 may communicate sidelink signals 927 within a vehicle-to-everything (V2X) network.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink or D2D networks other than V2X networks.

Figure 10:
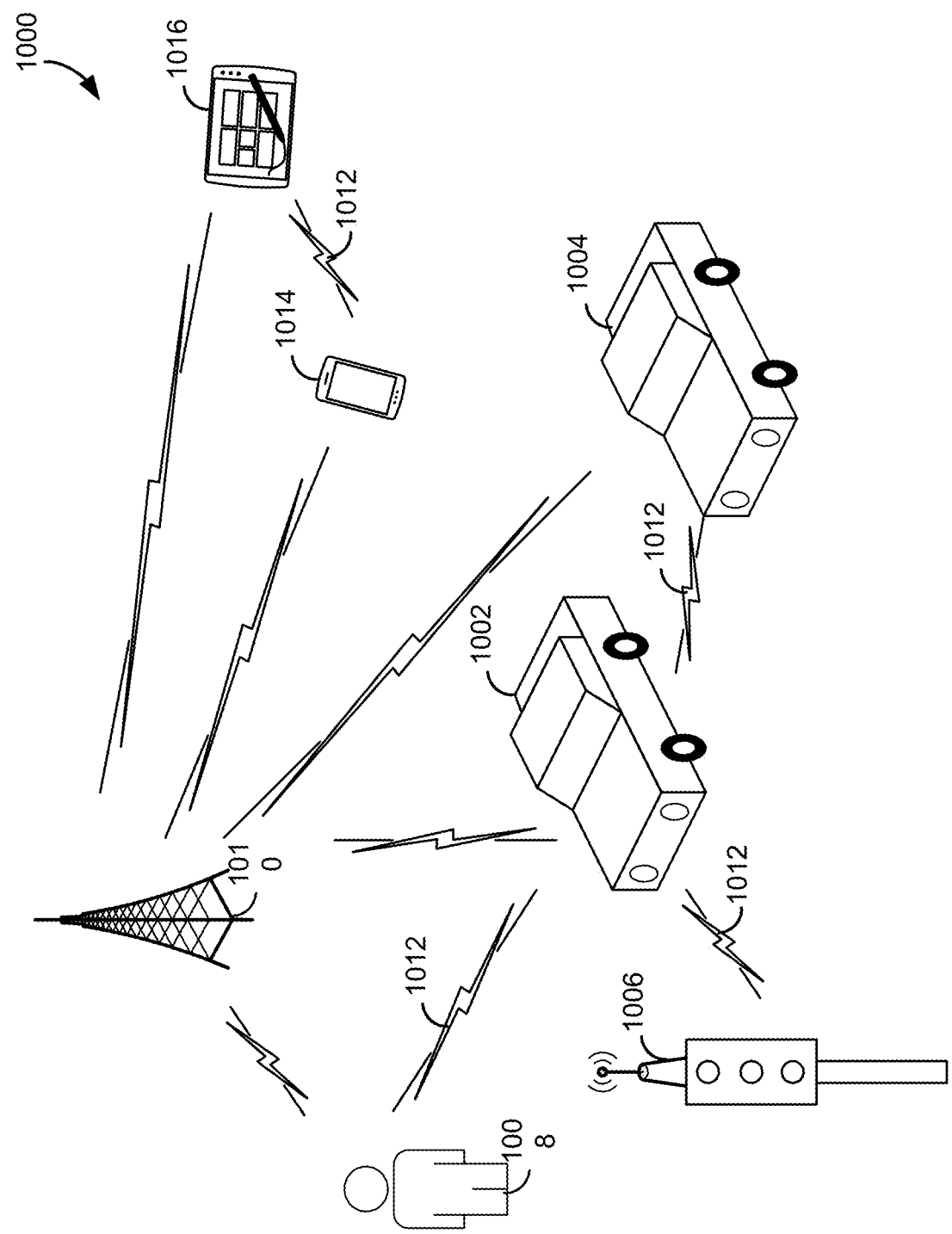
FIG. 10 illustrates an example of a wireless communication network configured to support D2D or sidelink communication.

FIG. 10 illustrates an example of a wireless communication network 1000 configured to support D2D or sidelink communication. In some examples, sidelink communication may include V2X communication. V2X communication involves the wireless exchange of information directly between not only vehicles (e.g., vehicles 1002 and 1004) themselves, but also directly between vehicles 1002/1004 and infrastructure 1006 (e.g., roadside units (RSUs)), such as streetlights, buildings, traffic cameras, tollbooths or other stationary objects, vehicles 1002/1004 and pedestrians 1008, and vehicles 1002/1004 and cellular networks (e.g., base station 1010). In some examples, V2X communication may be implemented in accordance with the New Radio (NR) cellular V2X standard defined by 3GPP, Release 15 or 16, or other suitable standard.

V2X communication enable vehicles 1002 and 1004 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 1002 and 1004 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 1008 may be utilized to trigger a warning sound, vibration, flashing light, etc., in case of imminent danger.

The sidelink communication between vehicle-UEs (VUEs) 1002 and 1004 or between a VUE 1002 or 1004 and either an RSU 1006 or a pedestrian-UE (PUE) 1008 occurs over a sidelink channel 1012. In some examples, the sidelink channel 1012 may support a proximity service (ProSe) PC5 interface. In various aspects of the disclosure, the sidelink channel 1012 implementing a PC5 interface may further be utilized to support D2D communication in other proximity use cases. Examples of other proximity use cases may include public safety or commercial (e.g., entertainment, education, office, medical, and/or interactive) based proximity services.

ProSe communication may support different operational scenarios, such as in-coverage, out-of-coverage, and partial coverage. Out-of-coverage refers to a scenario in which UEs (e.g., VUEs 1002 and 1004 and PUE 1008) are outside of the coverage area of a base station (e.g., base station 1010), but each are still configured for ProSe communication. Partial coverage refers to a scenario in which some of the UEs (e.g., VUE 1004) are outside of the coverage area of the base station 1010, while other UEs (e.g., VUE 1002 and PUE 1008) are in communication with the base station 1010. In-coverage refers to a scenario in which UEs (e.g., UEs 1014 and 1016) are in communication with the base station 1010 (e.g., gNB) via a Uu (e.g., cellular interface) connection to receive ProSe service authorization and provisioning information to support ProSe operations.

In any of the above operational scenarios, the various mobile sidelink devices (e.g., VUEs 1002 and 1004, PUE 1008, and other mobile sidelink devices communicating over the sidelink channel 1012) may determine their location (e.g., geographical coordinates) in the sidelink network 1000 using a sidelink positioning mechanism. To support sidelink positioning, positioning reference signals (PRSs) may be transmitted between the RSUs 1006, VUEs 1002 and 1004 and PUEs 1008. In some examples, the PRSs may be sequence-based signals and may further be transmitted over unlicensed spectrum (e.g., the ITS band) or licensed spectrum.

Depending on the capabilities of the mobile sidelink devices (e.g., VUEs 1002/1004 and PUE 1008), the respective location of each mobile sidelink device may be determined using sidelink-based (SL-b) positioning or sidelink-assisted (SL-a) positioning. In SL-b positioning, each mobile sidelink device computes their own location in a distributed manner using the broadcast PRSs. In SL-a positioning, the RSU 1006 or other server in the network computes the locations of mobile sidelink devices. In either SL-a positioning or SL-b positioning, the location of a mobile sidelink device (e.g., VUE 1002) may be determined based on the round-trip time (RTT) between the mobile sidelink device (e.g., VUE 1002) and other sidelink devices (e.g., RSU 1006). Such an RTT measurement indicates the distance between the two devices. With a number of such RTT measurements (and corresponding distances), multilateration may be used to determine the location of the mobile sidelink device. For example, VUE 1002 may obtain 3 RTT measurements made with 3 different RSUs. A first RTT measurement may indicate the distance between VUE 1002 and the first RSU. A second RTT measurement may indicate the distance between VUE 202 and the second RSU. A third RTT measurement may indicate the distance between VUE 1002 and the third RSU. If the location of the three RSUs are known, then the location of VUE 1002 may be determined by multilateration, e.g., using the three distances as radii of circles centered at the known RSU locations.

Figure 11:
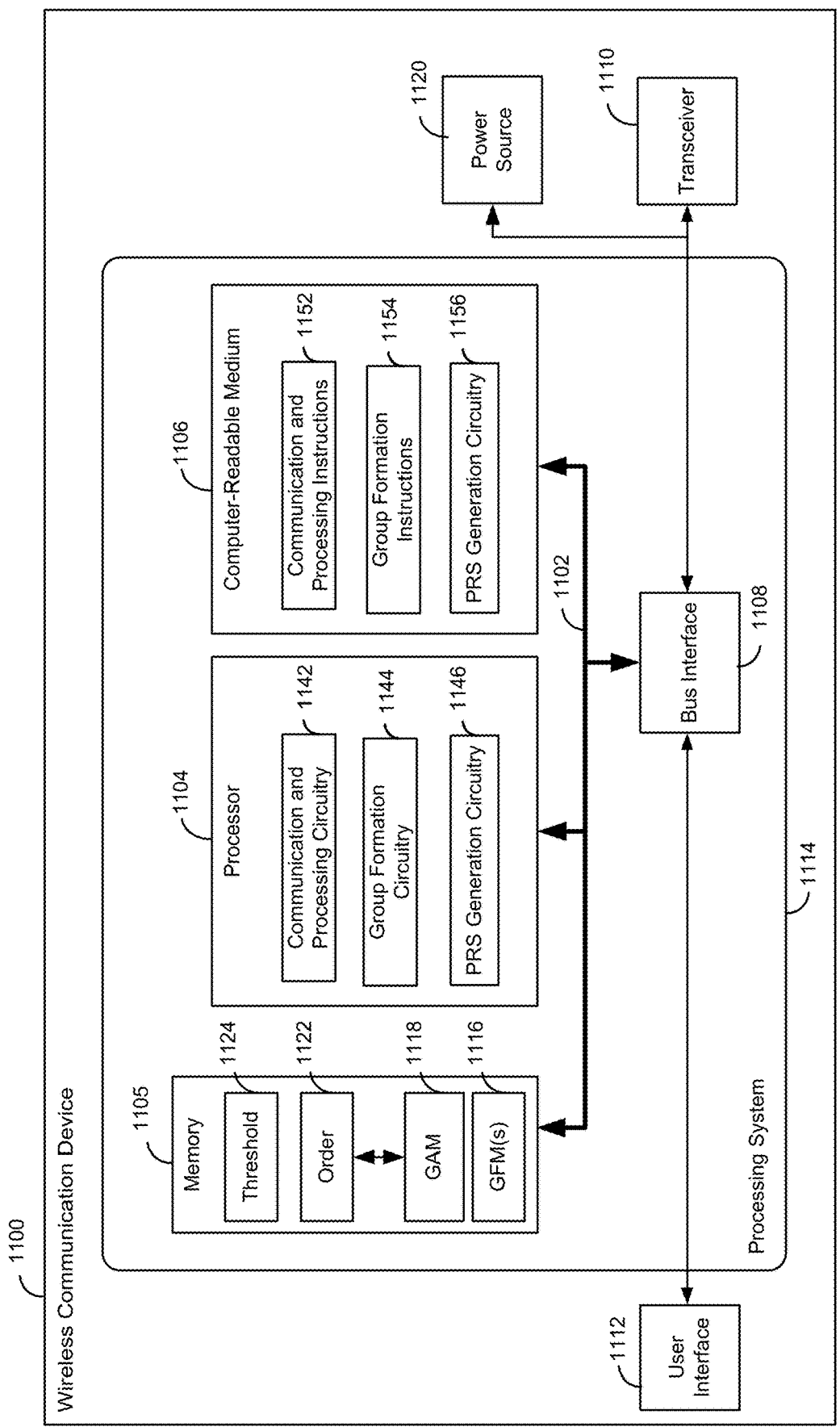
FIG. 11 is a block diagram illustrating an example of a hardware implementation for a wireless communication device employing a processing system.

FIG. 11 is a block diagram illustrating an example of a hardware implementation for a wireless communication device 1100 employing a processing system 1114. For example, the wireless communication device 1100 may correspond to a sidelink (e.g., V2X) device, such as an RSU, VUE, PUE, or other suitable sidelink device, as shown and described above in reference to FIG. 1-5 or 10.

The wireless communication device 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1100 may be configured to perform any one or more of the functions described herein. That is, the processor 1104, as utilized in the wireless communication device 1100, may be used to implement any one or more of the processes and procedures described below.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors (represented generally by the processor 1104), a memory 1105, and computer-readable media (represented generally by the computer-readable medium 1106. The bus 1102 may also link various other circuits such as timing sources, peripherals, voltage regulators, and power management circuits, which are well known in the art, and therefore, will not be described any further.

A bus interface 1108 provides an interface between the bus 1102 and a transceiver 1110. The transceiver 1110 provides a means for communicating with various other apparatus over a transmission medium (e.g., air interface). The bus interface 1108 further provides an interface between the bus 1102 and a power source (e.g., a battery) 1120. Depending upon the nature of the apparatus, a user interface 1112 (e.g., keypad, display, touch screen, speaker, microphone, control knobs, etc.) may also be provided. Of course, such a user interface 1112 is optional, and may be omitted in some examples.

The processor 1104 is responsible for managing the bus 1102 and general processing, including the execution of software stored on the computer-readable medium 1106. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. In some examples, the computer-readable medium 1106 may be part of the memory 1105. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include communication and processing circuitry 1142, configured to communicate with other wireless communication devices (e.g., RSUs, VUEs, PUEs, etc.) over a sidelink channel. In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission).

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the FIGs. may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 2-6 and 8-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

Implementation examples are described in the following numbered clauses:

Clause 1. A method for supporting position estimation, at a first user equipment (UE) device, comprising:

sending or receiving, via a sidelink channel, a ranging signal between the first UE device and a second UE device;

obtaining at least one ranging measurement based on the sending or receiving the ranging signal between the first UE device and a second UE device; and broadcasting, via the sidelink channel, (1) the at least one ranging measurement with a reference to the second UE device or (2) a position estimate for the first UE device based on the at least one ranging measurement.

Clause 2. The method of clause 1, further comprising:

at the first UE device, selecting the second UE device for range signaling by determining that a distance d between the first UE device and the second UE device satisfies a distance criterion.

Clause 3. The method of clause 2, wherein the determining that the distance d satisfies the distance criterion comprises determining that the distance d is greater than a minimum distance d1 and less than a maximum distance d2.

Clause 4. The method of clause 1, further comprising:

at the first UE device, selecting the second UE device for range signaling by randomly selecting the second UE device from a plurality of available UE devices.

Clause 5. The method of clause 4, wherein the second UE device is one of a number, N, of UE devices randomly selected from the plurality of available UE devices.

Clause 6. The method of clause 5, wherein the number N is determined prior to selecting the second UE device from the plurality of available UE devices.

Clause 7. The method of any of clauses 1-6, further comprising:

at the first UE device, receiving, from a requester UE device, a request to select the second UE device for range signaling, prior to the sending or receiving the ranging signal between the first UE device and a second UE device.

Clause 8. The method of clause 7, wherein the requester UE device is a vehicle user equipment (VUE) device.

Clause 9. The method of any of clauses 1-8, wherein the broadcasting the at least one ranging measurement with the reference to the second UE device comprises:

broadcasting a message containing (1) an identifier for each of a plurality of second UE devices and (2) at least one ranging measurement for each of the plurality of second UE devices.

Clause 10. The method of any of clauses 1-9, wherein the at least one ranging measurement comprises (1) a distance measurement, (2) an angle of arrival (AoA) measurement, (3) a time difference of arrival (TDOA) measurement, (4) a speed measurement associated with the first UE device, or (5) a time of measurement.

Clause 11. The method of any of clauses 1-10, wherein the broadcasting at the first UE device comprises broadcasting, via the sidelink channel, a safety message containing (1) the at least one ranging measurement with the reference to the second UE device or (2) the position estimate for the first UE device based on the at least one ranging measurement.

Clause 12. The method of any of clauses 1-11, wherein each of the first UE device and second UE device is a pedestrian user equipment (PUE) device.

Clause 13. The method of any of clauses 1-12, further comprising:

at the first UE device, receiving at least one additional ranging measurement based on a ranging signal sent between the second UE device and a third UE device;

at the first UE device, determining the position estimate for the first UE device using the at least one ranging measurement based on the ranging signal sent between the first UE device and the second UE device and the at least one additional ranging measurement based on the ranging signal sent between the second UE device and the third UE device; and at the first UE device, broadcasting the position estimate for the first UE device.

Clause 14. The method of clause 13, further comprising:

at the first UE device, obtaining a position estimate for the second UE device and a position estimate for the third UE device, wherein the determining the position estimate for the first UE device is further based on the position estimate for the second UE device and the position estimate for the third UE device.

Clause 15. A method for supporting position estimation, at a requester user equipment device, comprising:

receiving, via a sidelink channel, at least one first ranging measurement from a first user equipment (UE) device or a second UE device, the at least one first ranging measurement based on a ranging signal sent between the first UE device and the second UE device;

sending, via the sidelink channel, a request for a third UE device to perform range signaling with the first UE device or the second UE device;

receiving, via the sidelink channel, at least one second ranging measurement, based on a ranging signal sent between the third UE device and the first UE device or the second UE device in response to the request from the requester user equipment device; and determining a position estimate for the first UE device, based on the at least one first ranging measurement and the at least one second ranging measurement.

Clause 16. The method of clause 15, wherein the request for the third UE device to perform range signaling with the first UE device or the second UE device is sent from the requester user equipment device to the third UE device.

Clause 17. The method of clause 16, wherein the at least one second ranging measurement is received at the requester user equipment device from the third UE device.

Clause 18. The method of any of clauses 15-17, further comprising:

at the requester user equipment device, attempting to determine a position estimate for the first UE device, based on the at least one first ranging measurement, wherein the sending the request, for the third UE device to perform range signaling with the first UE device or the second UE device, is in response to the requester user equipment device failing to determine the position estimate for the first UE device, based on at least one first ranging measurement.

Clause 19. The method of any of clauses 15-18, further comprising:

at the requester user equipment device, obtaining a position estimate for the second UE device and a position estimate for the third UE device, wherein the determining the position estimate for the first UE device is further based on the position estimate for the second UE device and the position estimate for the third UE device.

Clause 20. The method of any of clauses 15-19, wherein:

the request, for the third UE device to perform range signaling with the first UE device or the second UE device, identifies both the first UE device and the second UE device for performing range signaling with a third UE device, and the at least one second ranging measurement comprises (a) a ranging measurement based on a ranging signal sent between the third UE device and the first UE device and (b) a ranging measurement based on a ranging signal sent between the third UE device and the second UE device.

Clause 21. The method of any of clauses 15-20, wherein the requester user equipment device is a vehicle user equipment (VUE) device.

Clause 22. The method of any of clauses 15-21, wherein each of the first UE device and second UE device is a pedestrian user equipment (PUE) device.

Clause 23. A first user equipment (UE) device in a wireless communication network, comprising:

a wireless transceiver;

a memory; and a processor communicatively coupled to the wireless transceiver and the memory, wherein the processor is configured to:

send or receive, using the wireless transceiver via a sidelink channel, a ranging signal between the first UE device and a second UE device;

obtain at least one ranging measurement based on the sending or receiving the ranging signal between the first UE device and a second UE device; and broadcasting, using the wireless transceiver via the sidelink channel, (1) the at least one ranging measurement with a reference to the second UE device or (2) a position estimate for the first UE device based on the at least one ranging measurement.

Clause 24. The first UE device of clause 23, wherein the processor is further configured to select the second UE device for range signaling by:

determining that a distance d between the first UE device and the second UE device satisfies a distance criterion.

Clause 25. The first UE device of clause 24, wherein the processor is further configured to determine that the distance d satisfies the distance criterion by:

determining that the distance d is greater than a minimum distance d1 and less than a maximum distance d2.

Clause 26. The first UE device of clause 23, wherein the processor is further configured to select the second UE device for range signaling by:

randomly selecting the second UE device from a plurality of available UE devices.

Clause 27. The first UE device of clause 26, wherein the second UE device is one of a number, N, of UE devices randomly selected from the plurality of available UE devices.

Clause 28. The first UE device of clause 27, wherein the number N is determined prior to selecting the second UE device from the plurality of available UE devices.

Clause 29. The first UE device of any of clauses 23-28, wherein the processor is further configured to:

receive, from a requester UE device, a request to select the second UE device for range signaling, prior to the sending or receiving the ranging signal between the first UE device and a second UE device.

Clause 30. The first UE device of clause 29, wherein the requester UE device is a vehicle user equipment (VUE) device.

Clause 31. The first UE device of any of clauses 23-30, wherein the processor is further configured to broadcast the at least one ranging measurement with the reference to the second UE device, by:

broadcasting a message containing (1) an identifier for each of a plurality of second UE devices and (2) at least one ranging measurement for each of the plurality of second UE devices.

Clause 32. The first UE device of any of clauses 23-31, wherein the at least one ranging measurement comprises (1) a distance measurement, (2) an angle of arrival (AoA) measurement, (3) a time difference of arrival (TDOA) measurement, (4) a speed measurement associated with the first UE device, or (5) a time of measurement.

Clause 33. The first UE device of any of clauses 23-32, wherein the processor is further configured to broadcast at the first UE device by:

broadcasting, via the sidelink channel, a safety message containing (1) the at least one ranging measurement with the reference to the second UE device or (2) the position estimate for the first UE device based on the at least one ranging measurement.

Clause 34. The first UE device of any of clauses 23-33, wherein each of the first UE device and second UE device is a pedestrian user equipment (PUE) device.

Clause 35. The first UE device of any of clauses 23-34, wherein the processor is further configured to:

receive at least one additional ranging measurement based on a ranging signal sent between the second UE device and a third UE device;

determine the position estimate for the first UE device using the at least one ranging measurement based on the ranging signal sent between the first UE device and the second UE device and the at least one additional ranging measurement based on the ranging signal sent between the second UE device and the third UE device; and broadcast the position estimate for the first UE device.

Clause 36. The first UE device of clause 35, wherein the processor is further configured to:

obtain a position estimate for the second UE device and a position estimate for the third UE device; and determine the position estimate for the first UE device based on the position estimate for the second UE device and the position estimate for the third UE device.

Clause 37. A requester user equipment device in a wireless communication network, comprising:

a wireless transceiver;
a memory; and
a processor communicatively coupled to the wireless transceiver and the memory, wherein the processor is configured to:

receive, using the wireless transceiver via a sidelink channel, at least one first ranging measurement from a first user equipment (UE) device or a second UE device, the at least one first ranging measurement based on a ranging signal sent between the first UE device and the second UE device;

send, using the wireless transceiver via the sidelink channel, a request for a third UE device to perform range signaling with the first UE device or the second UE device;

receive, using the wireless transceiver via the sidelink channel, at least one second ranging measurement, based on a ranging signal sent between the third UE device and the first UE device or the second UE device in response to the request from the requester user equipment device; and determine a position estimate for the first UE device, based on the at least one first ranging measurement and the at least one second ranging measurement.

Clause 38. The requester user equipment device of clause 37, wherein the processor is further configured to:

send the request, for the third UE device to perform range signaling with the first UE device or the second UE device, from the requester user equipment device to the third UE device.

Clause 39. The requester user equipment device of clause 38, wherein the at least one second ranging measurement is received at the requester user equipment device from the third UE device.

Clause 40. The requester user equipment device of any of clauses 37-39, wherein the processor is further configured to:

attempt to determine a position estimate for the first UE device, based on the at least one first ranging measurement; and send the request, for the third UE device to perform range signaling with the first UE device or the second UE device, in response to the requester user equipment device failing to determine the position estimate for the first UE device, based on at least one first ranging measurement.

Clause 41. The requester user equipment device of any of clauses 37-40, wherein the processor is further configured to:

obtain a position estimate for the second UE device and a position estimate for the third UE device; and determine the position estimate for the first UE device further based on the position estimate for the second UE device and the position estimate for the third UE device.

Clause 42. The requester user equipment device of any of clauses 37-41, wherein:

the request, for the third UE device to perform range signaling with the first UE device or the second UE device, identifies both the first UE device and the second UE device for performing range signaling with a third UE device, and the at least one second ranging measurement comprises (a) a ranging measurement based on a ranging signal sent between the third UE device and the first UE device and (b) a ranging measurement based on a ranging signal sent between the third UE device and the second UE device.

Clause 43. The requester user equipment device of any of clauses 37-42, wherein the requester user equipment device is a vehicle user equipment (VUE) device.

Clause 44. The requester user equipment device of any of clauses 37-43, wherein each of the first UE device and second UE device is a pedestrian user equipment (PUE) device.

Clause 45. A system for supporting position estimation, at a first user equipment (UE) device, comprising:

means for sending or receiving, via a sidelink channel, a ranging signal between the first UE device and a second UE device;

means for obtaining at least one ranging measurement based on the sending or receiving the ranging signal between the first UE device and a second UE device; and means for broadcasting, via the sidelink channel, (1) the at least one ranging measurement with a reference to the second UE device or (2) a position estimate for the first UE device based on the at least one ranging measurement.

Clause 46. A system for supporting position estimation, at a requester user equipment device, comprising:

means for receiving, via a sidelink channel, at least one first ranging measurement from a first user equipment (UE) device or a second UE device, the at least one first ranging measurement based on a ranging signal sent between the first UE device and the second UE device;

means for sending, via the sidelink channel, a request for a third UE device to perform range signaling with the first UE device or the second UE device;

means for receiving, via the sidelink channel, at least one second ranging measurement, based on a ranging signal sent between the third UE device and the first UE device or the second UE device in response to the request from the requester user equipment device; and means for determining a position estimate for the first UE device, based on the at least one first ranging measurement and the at least one second ranging measurement.

Clause 47. A non-transitory computer-readable medium having instructions stored therein for execution by one or more processors, the instructions, when executed, causing the one or more processors, at a first user equipment (UE) device, to:

send or receive, via a sidelink channel, a ranging signal between the first UE device and a second UE device;

obtain at least one ranging measurement based on the sending or receiving the ranging signal between the first UE device and a second UE device; and broadcast, via the sidelink channel, (1) the at least one ranging measurement with a reference to the second UE device or (2) a position estimate for the first UE device based on the at least one ranging measurement.

Clause 48. A non-transitory computer-readable medium having instructions stored therein for execution by one or more processors, the instructions, when executed, causing the one or more processors, at a requester user equipment device, to:

receive, via a sidelink channel, at least one first ranging measurement from a first user equipment (UE) device or a second UE device, the at least one first ranging measurement based on a ranging signal sent between the first UE device and the second UE device;

send, via the sidelink channel, a request for a third UE device to perform range signaling with the first UE device or the second UE device;

receive, via the sidelink channel, at least one second ranging measurement, based on a ranging signal sent between the third UE device and the first UE device or the second UE device in response to the request from the requester user equipment device; and determine a position estimate for the first UE device, based on the at least one first ranging measurement and the at least one second ranging measurement.

What is claimed is:

1. A method for supporting position estimation comprising:
    at a first user equipment (UE) device, selecting a second UE device with which to perform range signaling;
    from the first UE device, sending a request for range signaling to the second UE device;
    at the first UE device, receiving a response from the second UE device accepting the request for range signaling;
    at the first UE device, subsequent to receiving the response from the second UE device, sending or receiving, via a sidelink channel, a ranging signal between the first UE device and a second UE device;
    at the first UE device, obtaining at least one ranging measurement based on the sending or receiving the ranging signal between the first UE device and a second UE device; and
    at the first UE device, broadcasting, via the sidelink channel, (1) the at least one ranging measurement with a reference to the second UE device or (2) a position estimate for the first UE device based on the at least one ranging measurement.

2. The method of claim 1, wherein the selecting the second UE device for range signaling comprises determining that a distance d between the first UE device and the second UE device satisfies a distance criterion.

3. The method of claim 2, wherein the determining that the distance d satisfies the distance criterion comprises determining that the distance d is greater than a minimum distance d1 and less than a maximum distance d2.

4. The method of claim 1, wherein the selecting the second UE device for range signaling comprises randomly selecting the second UE device from a plurality of available UE devices.

5. The method of claim 4, wherein the second UE device is one of a number, N, of UE devices randomly selected from the plurality of available UE devices.

6. The method of claim 5, wherein the number N is determined prior to selecting the second UE device from the plurality of available UE devices.

7. The method of claim 1, further comprising:
    at the first UE device, receiving, from a requester UE device, a request to select the second UE device for range signaling, prior to the sending or receiving the ranging signal between the first UE device and a second UE device.

8. The method of claim 7, wherein the requester UE device is a vehicle user equipment (VUE) device.

9. The method of claim 1, wherein the broadcasting the at least one ranging measurement with the reference to the second UE device comprises:
    broadcasting a message containing (1) an identifier for each of a plurality of second UE devices and (2) at least one ranging measurement for each of the plurality of second UE devices.

10. The method of claim 1, wherein the at least one ranging measurement comprises (1) a distance measurement, (2) an angle of arrival (AoA) measurement, (3) a time difference of arrival (TDOA) measurement, (4) a speed measurement associated with the first UE device, or (5) a time of measurement.

11. The method of claim 1, wherein the broadcasting at the first UE device comprises broadcasting, via the sidelink channel, a safety message containing (1) the at least one ranging measurement with the reference to the second UE device or (2) the position estimate for the first UE device based on the at least one ranging measurement.

12. The method of claim 1, wherein each of the first UE device and second UE device is a pedestrian user equipment (PUE) device.

13. The method of claim 1, further comprising:
    at the first UE device, receiving at least one additional ranging measurement based on a ranging signal sent between the second UE device and a third UE device;
    at the first UE device, determining the position estimate for the first UE device using the at least one ranging measurement based on the ranging signal sent between the first UE device and the second UE device and the at least one additional ranging measurement based on the ranging signal sent between the second UE device and the third UE device; and
    at the first UE device, broadcasting the position estimate for the first UE device.

14. The method of claim 13, further comprising:
at the first UE device, obtaining a position estimate for the second UE device and a position estimate for the third UE device,
wherein the determining the position estimate for the first UE device is further based on the position estimate for the second UE device and the position estimate for the third UE device.

15. A first user equipment (UE) device in a wireless communication network, comprising:
a wireless transceiver;
a memory; and
a processor communicatively coupled to the wireless transceiver and the memory, wherein the processor is configured to:
select a second UE device with which to perform range signaling;
send a request for range signaling to the second UE device;
receive a response from the second UE device accepting the request for range signaling;
subsequent to receiving the response from the second UE device, send or receive, using the wireless transceiver via a sidelink channel, a ranging signal between the first UE device and a second UE device;
obtain at least one ranging measurement based on the sending or receiving the ranging signal between the first UE device and a second UE device; and
broadcasting, using the wireless transceiver via the sidelink channel, (1) the at least one ranging measurement with a reference to the second UE device or (2) a position estimate for the first UE device based on the at least one ranging measurement.

16. The first UE device of claim 15, wherein the processor is configured to select the second UE device for range signaling by:
determining that a distance d between the first UE device and the second UE device satisfies a distance criterion.

17. The first UE device of claim 16, wherein the processor is further configured to determine that the distance d satisfies the distance criterion by:
determining that the distance d is greater than a minimum distance d1 and less than a maximum distance d2.

18. The first UE device of claim 15, wherein the processor is configured to select the second UE device for range signaling by:
randomly selecting the second UE device from a plurality of available UE devices.

19. The first UE device of claim 18, wherein the second UE device is one of a number, N, of UE devices randomly selected from the plurality of available UE devices.

20. The first UE device of claim 19, wherein the number N is determined prior to selecting the second UE device from the plurality of available UE devices.

21. The first UE device of claim 15, wherein the processor is further configured to:
receive, from a requester UE device, a request to select the second UE device for range signaling, prior to the sending or receiving the ranging signal between the first UE device and a second UE device.

22. The first UE device of claim 21, wherein the requester UE device is a vehicle user equipment (VUE) device.

23. The first UE device of claim 15, wherein the processor is further configured to broadcast the at least one ranging measurement with the reference to the second UE device, by:
broadcasting a message containing (1) an identifier for each of a plurality of second UE devices and (2) at least one ranging measurement for each of the plurality of second UE devices.

24. The first UE device of claim 15, wherein the at least one ranging measurement comprises (1) a distance measurement, (2) an angle of arrival (AoA) measurement, (3) a time difference of arrival (TDOA) measurement, (4) a speed measurement associated with the first UE device, or (5) a time of measurement.

25. The first UE device of claim 15, wherein the processor is further configured to broadcast at the first UE device by:
broadcasting, via the sidelink channel, a safety message containing (1) the at least one ranging measurement with the reference to the second UE device or (2) the position estimate for the first UE device based on the at least one ranging measurement.

26. The first UE device of claim 15, wherein each of the first UE device and second UE device is a pedestrian user equipment (PUE) device.

27. The first UE device of claim 15, wherein the processor is further configured to:
receive at least one additional ranging measurement based on a ranging signal sent between the second UE device and a third UE device;
determine the position estimate for the first UE device using the at least one ranging measurement based on the ranging signal sent between the first UE device and the second UE device and the at least one additional ranging measurement based on the ranging signal sent between the second UE device and the third UE device; and
broadcast the position estimate for the first UE device.

28. The first UE device of claim 27, wherein the processor is further configured to:
obtain a position estimate for the second UE device and a position estimate for the third UE device; and
determine the position estimate for the first UE device based on the position estimate for the second UE device and the position estimate for the third UE device.

29. A system for supporting position estimation comprising:
means at a first user equipment (UE) device for selecting a second UE device with which to perform range signaling;
means at the first UE device for sending a request for range signaling to the second UE device;
means at the first UE device for receiving a response from the second UE device accepting the request for range signaling;
means at the first UE device for, subsequent to receiving the response from the second UE device, sending or receiving, via a sidelink channel, a ranging signal between the first UE device and a second UE device;
means at the first UE device for obtaining at least one ranging measurement based on the sending or receiving the ranging signal between the first UE device and a second UE device; and
means at the first UE device for broadcasting, via the sidelink channel, (1) the at least one ranging measurement with a reference to the second UE device or (2) a position estimate for the first UE device based on the at least one ranging measurement.

30. A non-transitory computer-readable medium having instructions stored therein for execution by one or more processors, the instructions, when executed, causing the one or more processors, at a first user equipment (UE) device, to:
- select a second UE device with which to perform range signaling;
- send a request for range signaling to the second UE device;
- receive a response from the second UE device accepting the request for range signaling;
- subsequent to receiving the response from the second UE device, send or receive, via a sidelink channel, a ranging signal between the first UE device and a second UE device;
- obtain at least one ranging measurement based on the sending or receiving the ranging signal between the first UE device and a second UE device; and
- broadcast, via the sidelink channel, (1) the at least one ranging measurement with a reference to the second UE device or (2) a position estimate for the first UE device based on the at least one ranging measurement.

* * * * *